(12) United States Patent
Rao et al.

(10) Patent No.: US 11,720,592 B2
(45) Date of Patent: *Aug. 8, 2023

(54) GENERATING OVERLAP ESTIMATIONS BETWEEN HIGH-VOLUME DIGITAL DATA SETS BASED ON MULTIPLE SKETCH VECTOR SIMILARITY ESTIMATORS

(71) Applicant: Adobe Inc., San Jose, CA (US)

(72) Inventors: Anup Rao, San Jose, CA (US); Tung Mai, San Jose, CA (US); Matvey Kapilevich, Irvington, NY (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,974

(22) Filed: Aug. 10, 2022

(65) Prior Publication Data

US 2022/0391407 A1 Dec. 8, 2022

Related U.S. Application Data

(63) Continuation of application No. 17/090,556, filed on Nov. 5, 2020, now Pat. No. 11,449,523.

(51) Int. Cl.
*G06F 16/00* (2019.01)
*G06F 16/26* (2019.01)
(Continued)

(52) U.S. Cl.
CPC ............ *G06F 16/26* (2019.01); *G06F 16/285* (2019.01); *G06F 16/288* (2019.01); *G06T 11/206* (2013.01)

(58) Field of Classification Search
CPC .. G06F 16/2255; G06F 16/2365; G06F 16/29; G06F 16/26; G06F 16/285;
(Continued)

(56) References Cited

U.S. PATENT DOCUMENTS

2009/0106082 A1 4/2009 Senti et al.
2016/0189186 A1* 6/2016 Fabrikant ........... G06Q 30/0205
705/7.34

(Continued)

OTHER PUBLICATIONS

Bayardo et al. (2007). Scaling up all pairs similarity search. In Proceedings of the 16th international conference on World Wide Web, pp. 131-140. ACM.

(Continued)

*Primary Examiner* — Shyue Jiunn Hwa
(74) *Attorney, Agent, or Firm* — Keller Preece PLLC

(57) ABSTRACT

The present disclosure relates to systems, methods, and non-transitory computer-readable media that estimate the overlap between sets of data samples. In particular, in one or more embodiments, the disclosed systems utilize a sketch-based sampling routine and a flexible, accurate estimator to determine the overlap (e.g., the intersection) between sets of data samples. For example, in some implementations, the disclosed systems generate a sketch vector—such as a one permutation hashing vector—for each set of data samples. The disclosed systems further compare the sketch vectors to determine an equal bin similarity estimator, a lesser bin similarity estimator, and a greater bin similarity estimator. The disclosed systems utilize one or more of the determined similarity estimators in generating an overlap estimation for the sets of data samples.

20 Claims, 13 Drawing Sheets

(51) Int. Cl.
*G06T 11/20* (2006.01)
*G06F 16/28* (2019.01)

(58) Field of Classification Search
CPC ........ G06F 16/288; G06F 16/93; G06F 21/44; G06F 21/64; H04W 4/025; H04W 4/026; H04W 4/027; H04W 4/029; H04W 4/80; G06Q 30/0205; G05D 1/0212; G05D 2201/0213
See application file for complete search history.

(56) References Cited

U.S. PATENT DOCUMENTS

| | | | |
|---|---|---|---|
| 2017/0091795 A1* | 3/2017 | Mansour | G06Q 30/0205 |
| 2018/0121820 A1* | 5/2018 | Manasse | G06F 18/22 |
| 2018/0181609 A1* | 6/2018 | Chen | G06F 16/2255 |
| 2021/0034914 A1* | 2/2021 | Bansal | G06V 10/25 |
| 2021/0406232 A1* | 12/2021 | Sheppard | H04N 21/812 |

OTHER PUBLICATIONS

Broder, A. Z. (1997). On the resemblance and containment of documents. In Compression and complexity of sequences 1997. proceedings, pp. 21-29. IEEE.
Broder et al. (1997). Syntactic clustering of the web. Computer Networks and ISDN Systems, 29(8):1157-1166.
Chen, B. and Shrivastava, A. (2016). Revisiting winner take all (WTA) hashing for sparse datasets. CoRR, abs/1612.01834.
Chum, O.; et al., (2007). Scalable near identical image and shot detection. pp. 549-556.
Chum, O.; et al., (2008). Near duplicate image detection: minhash and tf-idf weighting.
Ondov, D.; et al., (2016). Mash: Fast genome and metagenome distance estimation using minhash. Genome Biology, 17.
Dahlgaard, S. et al., (2015). Hashing for statistics over k-partitions. In Proc. 56th IEEE Symposium on Foundations of Computer Science, pp. 1292-1310. ACM.
Dahlgaard, S. et al., (2017). Fast similarity sketching. In Foundations of Computer Science (FOCS), 2017 IEEE 58th Annual Symposium on, pp. 663-671. IEEE.
Henzinger, M. (2006). Finding near-duplicate web pages: a large-scale evaluation of algorithms. In Proceedings of the 29th annual international ACM SIGIR conference on Research and development in information retrieval, pp. 284-291. ACM.
Indyk, P. and Motwani, R. (1998). Approximate nearest neighbors: towards removing the curse of dimensionality. In Proceedings of the thirtieth annual ACM symposium on Theory of computing, pp. 604-613. ACM.
Li, P. et al. (2012). One permutation hashing. In Advances in Neural Information Processing Systems, pp. 3113-3121.
Li, P. et al., (2011). Hashing algorithms for large-scale learning. In Advances in neural information processing systems, pp. 2672-2680.
Mai, T., Rao, A., Kapilevich, M., Rossi, R. A., Abbasi-Yadkori, Y., & Sinha, R. (2019). On Densification for Minwise Hashing. In UAI (p. 302).
Manasse, M., McSherry, F., and Talwar, K. (2010). Consistent weighted sampling.
Shi, Y., Cost, R., Perlich, C., Hook, R., Martin, W., Han Williams, M., Moynihan, J., McCarthy, P., Lenz, P., and Daniel-Weiner, R. (2018). Audience size forecasting: Fast and smart budget planning for media buyers. pp. 744-753.
Shrivastava, A. (2017). Optimal densification for fast and accurate minwise hashing. In Precup, D. and Teh, Y. W., editors, Proceedings of the 34th International Conference on Machine Learning, vol. 70 of Proceedings of Machine Learning Research, pp. 3154-3163, International Convention Centre, Sydney, Australia. PMLR.
Shrivastava, A. and Li, P. (2014a). Densifying one permutation hashing via rotation for fast near neighbor search. In International Conference on Machine Learning, pp. 557-565.
Shrivastava, A. and Li, P. (2014b). Improved densification of one permutation hashing. In Proceedings of the Thirtieth Conference on Uncertainty in Artificial Intelligence, UAI'14, pp. 732-741, Arlington, Virginia, United States. AUAI Press.
U.S. Appl. No. 17/090,556, Jan. 28, 2022, Office Action.
U.S. Appl. No. 17/090,556, May 10, 2022, Notice of Allowance.

* cited by examiner

US 11,720,592 B2

GENERATING OVERLAP ESTIMATIONS BETWEEN HIGH-VOLUME DIGITAL DATA SETS BASED ON MULTIPLE SKETCH VECTOR SIMILARITY ESTIMATORS

CROSS-REFERENCE TO RELATED APPLICATIONS

The present application is a continuation of U.S. application Ser. No. 17/090,556, filed on Nov. 5, 2020. The aforementioned application is hereby incorporated by reference in its entirety.

BACKGROUND

Recent years have seen significant advancement in hardware and software platforms for performing complex digital analysis and comparison algorithms with regard to voluminous digital data repositories. For example, many conventional systems can analyze high-volume digital data sets to determine a variety of relationships within the digital data, such as the similarity or overlap between digital data volumes. These conventional systems can provide various benefits using the analyses provided by such computer-implemented models. To illustrate, conventional systems can generate digital recommendations for digital content distribution across computer networks based on determined overlaps between digital trait segments.

Despite these advances, however, conventional relationship analysis systems suffer from several technological shortcomings that result in inefficient, inflexible, and inaccurate operation. For example, conventional relationship analysis systems often employ inefficient models to determine overlap measures between sets of digital data. To illustrate, many conventional systems employ models that utilize computationally-expensive join operations in determining the overlap between the sets. Because the analyses are generally performed on large datasets, such systems often demand a significant amount of computer resources (e.g., time, processing power, and computer memory).

In addition, many conventional systems are rigid and inaccurate. For example, conventional relationship analysis systems estimate the overlap between data sets based on a comparison of matching sketch vector values. Such systems fail to flexibly adapt the analysis or approach based on features or information of individual digital data set. Moreover, such approaches are often inaccurate in determining the degree of overlap between two high-volume digital data sets. Indeed many conventional systems suffer from high sampling rates, poor representations of the digital data, and high error rates for the resulting analyses.

The foregoing drawbacks, along with additional technical problems and issues, exist with regard to conventional data relationship analysis systems.

SUMMARY

One or more embodiments described herein provide benefits and/or solve one or more of the foregoing or other problems in the art with systems, methods, and non-transitory computer-readable media that efficiently and accurately generate overlap estimations between high-volume digital datasets utilizing multiple sketch vector similarity estimators. In particular, in one or more embodiments, the disclosed systems utilize a sketch-based sampling routine and information from three similarity estimators to estimate the intersection size of two datasets. To illustrate, in one or more embodiments, the disclosed systems utilize a sketching algorithm—such as one permutation hashing—to generate sketches for the data sets. The disclosed systems process the sketches and extract multiple similarity estimators by comparing sketch bins within the sketch vectors. For example, the disclosed systems determine an equal bin similarity estimator (reflecting equal slot values within the sketch vectors), a lesser bin similarity estimator (reflecting unequal and comparatively lesser slot values between the sketch vectors), and a greater bin similarity estimator (reflecting unequal and comparatively greater slot values between the sketch vectors). In some embodiments, the disclosed systems dynamically select which similarity estimator to use by analyzing variance metrics corresponding to each similarity estimator. For example, the disclosed systems can utilize the variance metrics to select a similarity estimator and/or determine a weighted combination from the three similarity estimators. In this manner, the disclosed systems can efficiently generate an accurate overlap estimation between high-volume data sets while flexibly adapting extracted information from the sketches.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
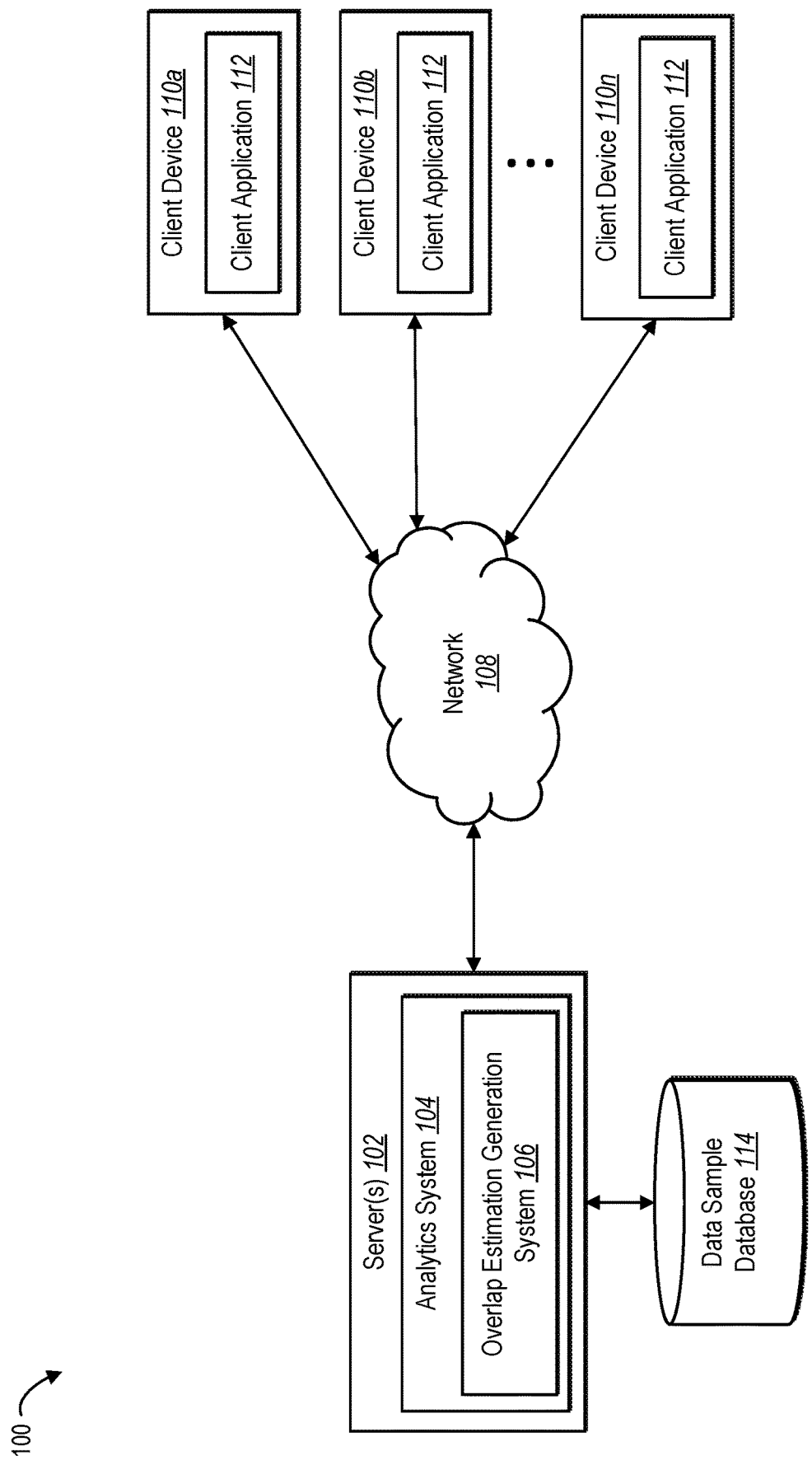
FIG. 1 illustrates an example environment in which an overlap estimation generation system can operate in accordance with one or more embodiments.

One or more embodiments described herein include an overlap estimation generation system that utilizes data sketches and dynamic similarity estimators to flexibly, accurately, and efficiently estimate overlap between high-volume digital datasets. To illustrate, in some implementations, the overlap estimation generation system generates sketch vectors (e.g., one permutation hashing vectors) for two sets of data samples. The overlap estimation generation system compares the bins (e.g., slots) of the sketch vectors to determine various unbiased estimators based on whether or not the value of a particular bin from one sketch vector is equal to, lesser than, or greater than, the value of the corresponding bin from the other sketch vector. For example, in some implementations, the overlap estimation system determines an equal bin similarity estimator, a lesser bin similarity estimator, and a greater bin similarity estimator. Moreover, in some instances the overlap estimation generation system utilizes these estimators to determine and provide an overlap estimation. For example, the overlap estimation generation system determines different variance metrics corresponding to the estimators and then selects and/or combines one or more estimators to apply based on the variance metrics. In this manner, the overlap estimation generation system can efficiently generate and provide an accurate overlap estimation between high-volume datasets utilizing dynamic combinations of different similarity estimators that vary according to the particular data sets at issue.

As just mentioned, in one or more embodiments the overlap estimation generation system generates an overlap estimation that corresponds to different sets of data samples (e.g., a first set of data samples and a second set of data samples). Indeed, in some embodiments, the overlap estimation indicates a degree of overlap between the first set of data samples and the second set of data samples. In some cases, the first set of data samples and the second set of data samples are very large, each including millions of data samples (or more).

In some implementations, the first set of data samples and the second set of data samples include subsets of data samples from a larger dataset. In particular, the first set of data samples corresponds to a first attribute of the digital data stored in the larger dataset and the second set of data samples correspond to a second attribute of the digital data. For example, in some implementations, the first set of data samples corresponds to a first distribution segment trait and the second set of data samples corresponds to a second distribution segment trait.

As mentioned above, in one or more embodiments the overlap estimation generation system generates the overlap estimation by generating a sketch vector for the first set of data samples and a sketch vector for the second set of data samples. In particular, the overlap estimation generation system generates the sketch vectors using a sketching algorithm. For example, the overlap estimation generation system utilizes a one permutation hashing algorithm to generate one permutation hashing vectors for the first set of data samples and the second set of data samples. In some cases, each resulting sketching vector includes a set of bins (e.g., slots).

As mentioned above, in one or more embodiments the overlap estimation generation system generates the overlap estimation by further determining similarity estimators (e.g., Jaccard similarity estimators). For example, the overlap estimation generation system determines an equal bin similarity estimator, a lesser bin similarity estimator, and a greater bin similarity estimator. In some implementations, the overlap estimation generation system determines the similarity estimators by comparing the set of bins of the sketching vector for the first set of data samples with the set of bins of the sketching vector for the second set of data samples. For instance, the overlap estimation generation system compares the bins to determine an equal bin similarity estimator, a lesser bin similarity estimator, or a greater bin similarity estimator based on whether the bin value of a given bin for the first set of data samples is equal to, less than, or greater than the bin value of the corresponding bin for the second set of data samples. In one or more embodiments, the overlap estimation generation system further determines one or more of the similarity estimators based on a size of the first set of data samples and a size of the second set of data samples.

In some embodiments, the overlap estimation generation system further determines variance metrics corresponding to the similarity estimators. For example, in some instances, the overlap estimation generation system determines an equal bin variance metric corresponding to an equal bin similarity estimator, a lesser bin variance metric corresponding to a lesser bin similarity estimator, and a greater bin variance metric corresponding to a greater bin similarity estimator. In some implementations, a variance metric indicates a measure of variance for the corresponding similarity estimator. For example, in some implementations, a variance metric is directly proportional to a measure of variance for the corresponding similarity estimator.

In one or more embodiments, the overlap estimation generation system determines a final similarity estimator using the one or more similarity estimators. For example, in some implementations, the overlap estimation generation system utilizes, as the final similarity estimator, the similarity estimator having the lowest-valued variance metric. In some cases, the overlap estimation generation system combines two or more similarity estimators (e.g., using weighted values based on the corresponding variance metrics) to determine the final similarity estimator.

In some implementations, the final similarity estimator provides a measure of similarity between the first set of data samples and the second set of data samples. For example, in some embodiments, the final similarity estimator provides the Jaccard similarity between the first set of data samples and the second set of data samples.

In one or more embodiments, the overlap estimation generation system generates the overlap estimation for the first set of data samples and the second set of data samples based on the measure of similarity determined using the final similarity estimator. Further, in some implementations, the overlap estimation generation system provides the overlap estimation for display via a client device.

The overlap estimation generation system can provide several advantages relative to conventional systems. For example, the overlap estimation generation system can improve efficiency relative to conventional systems. In particular, by utilizing a sketching algorithm (e.g., one permutation hashing) and a variety of similarity estimators, the overlap estimation generation system can significantly reduce the cost of generating an overlap estimation between sets of data samples. In the context of large datasets, the overlap estimation generation system can significantly reduce the computer resources (e.g., time, processing power, and computer memory) required when compared to conventional systems.

In addition, the overlap estimation generation system can improve flexibility relative to conventional systems. Indeed, while conventional systems typically estimate the overlap between sets of digital data rigidly based on matching values associated with the sets of digital data, the overlap estimation generation system flexibly utilizes a variety of similarity estimators depending on the variance of particular sets of data samples. Indeed, as mentioned, the overlap estimation generation system can determine three different similarity estimators and utilize one or more of these similarity estimators based on their corresponding variance metrics. Thus, the overlap generation system can flexibly determine how and to what degree to use these similarity estimators by comparing the sets of data samples (e.g., comparing their corresponding sketch vectors).

Further, the overlap estimation generation system operates more accurately than conventional systems. For example, by generating an overlap estimation based on different similarity estimators, the overlap estimation generation system more accurately determines the overlap between the sets of data samples. This is especially true when one set of data samples is largely (e.g., entirely) contained within the other set of data samples. Further, by comparing sketch vectors generated from the sets of data samples, the overlap estimation generation system improves upon error rates and sampling rates used by many conventional systems.

As illustrated by the foregoing discussion, the present disclosure utilizes a variety of terms to describe features and benefits of the overlap estimation generation system. Additional detail is now provided regarding the meaning of these terms. For example, as used herein the term "data sample" refers to a data point within a data set. In particular, a data sample includes a collection of one or more traits, features, or values corresponding to an item, event, device, individual, or instance. To illustrate, in some instances, a data sample includes a digital data point corresponding to characteristics or attributes associated with a computing device (e.g., a distribution segment trait), a product, or a service. Further, in some implementations, a data sample includes an identifier, such as a device identifier to indicate an association of the data sample with a particular client device. As used herein, the term "set of data samples" refers to a collection of data samples. For example, a set of data samples can include data samples sharing a common characteristic or feature (e.g., all client devices in a particular location or all devices utilizing a particular operating system).

Additionally, as used herein, the term "overlap" refers to commonalities between sets of data samples. In particular, in one or more embodiments, an overlap refers to an intersection between the sets of data samples. To illustrate, in some implementations, an overlap between sets of data samples refers to a set of common data samples (e.g., the data samples that belong to both sets of data samples). In some cases, the overlap estimation generation system expresses the overlap as the set of common data samples. In some instances, the overlap estimation generation system expresses the overlap as a numerical value (e.g., representing the number of common data samples) or a percentage (e.g., representing the amount of one set of data samples that is also included in another set of data samples). Relatedly, as used herein, the term "overlap estimation" refers to an estimate of an overlap between sets of data samples. For example, in some implementations, an overlap estimation refers to an estimate of an overlap generated from sampled data points from the sets of data samples or sketches generated from the sets of data samples.

Further, as used herein, the term "sketch vector" refers to an approximation of input data that reduces the dimensionality of the input data. In particular, in one or more embodiments, a sketch vector refers to a data structure (e.g., a vector) that includes (e.g., stores) a collection of data values that summarizes or approximates input data while preserving one or more characteristics or attributes of the input data. For example, in some implementations, a sketch vector includes a vector that includes a collection of data that is a compressed version of a larger collection of data (e.g., a set of data samples or a larger dataset that includes multiple sets of data samples). To illustrate, in some cases, a sketch vector includes a minwise hashing vector. In some instances, a sketch vector includes a one permutation hashing vector. As used herein, the term "one permutation hashing vector" refers to a sketch vector generated using a one permutation hashing algorithm.

As used herein, the term "sketching algorithm" refers to a computer-implemented algorithm or model that generates sketch vectors. In particular, in one or more embodiments, a sketching algorithm includes a computer-implemented algorithm that generates a sketch vector for an input data based on the values of the input data. To illustrate, in some instances, a sketching algorithm includes a minwise hashing algorithm. In some implementations, a sketching algorithm includes a one permutation hashing algorithm. As used herein, the term "one permutation hashing algorithm" refers to a computer-implemented algorithm or model that generates one permutation hashing vectors. For example, in one or more embodiments, a one permutation hashing algorithm refers to a computer-implemented algorithm that generates a one permutation hashing vector corresponding to a characteristic or attribute of digital data (e.g., digital data included in a dataset or a set of data samples) based on one pass or one step of analysis of the digital data. In some implementations, a one permutation hashing model includes a computer-implemented algorithm for applying a hash function to samples of the digital data in a single pass to generate a one permutation hashing vector corresponding to a characteristic or attribute of the digital data.

In one or more embodiments, a sketch vector includes a plurality of bins. As used herein, the term "bin" refers to a slot of a sketch vector. In particular, in one or more embodiments, a bin refers to a slot of a sketch vector that includes (e.g., stores) a data value. For example, in some implementations, a bin store a data value that corresponds to a data sample, such as a data value that represents a characteristic or attribute of a data sample. As used herein, the term "bin value" refers to a data value associated with (e.g., stored in) a bin of a sketch vector. Further, as used herein, the term "set of bins" refers to a collection of one or more bins. Relatedly, as used herein the term "subset of bins" refers to a collection of one or more bins representing a portion (or all) of the bins included in a set of bins.

In some implementations, a bin of a sketch vector stores a hash value. As used herein, the term "hash value" refers to a data value that is mapped to another data value. In particular, in one or more embodiments, a hash value includes a data value of fixed size that is generated (e.g., by a hash function) from a data value of fixed or arbitrary size. For example, in some implementations, a hash value includes a data value representing a characteristic or attribute of a data sample (e.g., generated from a digital data point of a data sample).

As used herein, the term "measure of a union" (or "union") refers to the measure of a combination of sets of data samples. For example, in one or more embodiments, a union between sets of data samples refers to the collection of data samples that are included in at least one of the sets of data samples. In some cases, the overlap estimation generation system expresses the union as a set of the data samples that are found in at least one of the sets of data samples. In some instances, the overlap estimation generation system expresses the union as a numerical value (e.g., representing the number of data samples that are found in at least one of the sets of data samples).

Additionally, as used herein, the term "similarity estimator" refers to an estimation of a degree of likeness between sets of data samples. In particular, in one or more embodiments, a similarity estimator includes an estimated measure (e.g., a quantitative measure) of the relatedness of sets of data samples. Indeed, in some implementations, a similarity estimator indicates a measure of similarity between sets of data samples. For example, in some implementations, a similarity estimator indicates a Forbes coefficient or Jaccard similarity (e.g., a Jaccard index). As used herein, the term "Jaccard similarity" refers to a measure of similarity between sets of data samples based on the overlap (e.g., intersection) between the sets of data samples and the union between the sets of data samples. For example, in some implementations, the Jaccard similarity includes a measure of similarity determined by dividing the overlap by the union.

In some implementations, a similarity estimator includes an equal bin similarity estimator, a lesser bin similarity estimator, and/or a greater bin similarity estimator. As used herein, the term "equal bin similarity estimator" refers to a similarity estimator that contributes to the estimation of the similarity between sets of data samples based on the number of bins of a sketch vector for one set of data samples that include bin values that are equal to the bin values of corresponding bins of a sketch vector for another set of data samples. Similarly, as used herein, the term "lesser bin similarity estimator" refers to a similarity estimator that contributes to the estimation of the similarity between sets of data samples based on the number of bins of a sketch vector for one set of data samples that include bin values that are less than the bin values of corresponding bins of a sketch vector for another set of data samples. Further, as used herein, the term "greater bin similarity estimator" refers to a similarity estimator that contributes to the estimation of the similarity between sets of data samples based on the number of bins of a sketch vector for one set of data samples that include bin values that are greater than the bin values of corresponding bins of a sketch vector for another set of data samples.

Relatedly, as used herein, the term "final similarity estimator" refers to a similarity estimator that generates an estimation of the similarity between sets of data samples using one or more similarity estimators. For example, in some implementations, a final similarity estimator includes one of an equal bin similarity estimator, a lesser bin similarity estimator, or a greater bin similarity estimator. In some cases, a final similarity estimator includes a combination (e.g., a weighted combination) of two or more of an equal bin similarity estimator, a lesser bin similarity estimator, or a greater bin similarity estimator.

As used herein, the term "measure of variance" (or "variance") refers to a measure of error or deviation in an output. In particular, in one or more embodiments, a variance refers to a value that represents the deviation of outputs generated by a computer-implemented algorithm or model, such as a similarity estimator. For example, in some implementations, a variance refers to a standard deviation of the outputs generated by a similarity estimator or a square of the standard deviation of such outputs.

Relatedly, as used herein, the term "variance metric" refers to a metric that is indicative of a variance. In particular, in one or more embodiments, a variance metric includes a value that corresponds to the variance of a similarity estimator. For example, in some implementations, a variance metric includes a value that is directly proportional or indirectly proportional to a variance corresponding to a similarity estimator. Accordingly, as used herein, the term "equal bin variance metric" refers to a variance metric corresponding to an equal bin similarity estimator, the term "lesser bin variance metric" refers to a variance metric corresponding to a lesser bin similarity estimator, and the term "greater bin variance metric" refers to a variance metric corresponding to a greater bin similarity estimator.

As used herein the term "segment trait" refers to a trait or characteristic associated with a client device. In particular, in one or more embodiments, a segment trait refers to digital data that describes a client device or an environment, circumstance, or status of the client device. For example, in some instances, a segment trait includes an age, gender, or location associated with a client device (e.g., associated with a user of the client device), a type of computing device (e.g., mobile versus laptop), operating system, client device manufacturer, a subscription status with respect to an online service or computer application, interaction history, purchase history, etc. Further, a segment trait can refer to a particular population of client devices associated with the same trait or characteristic. Relatedly, in one or more embodiments, the term "distribution segment trait" refers to a segment trait utilized (e.g., targeted) for the distribution of digital content, products, and/or services.

Additional detail regarding the overlap estimation generation system will now be provided with reference to the figures. For example, FIG. 1 illustrates a schematic diagram of an exemplary system environment ("environment") 100 in which an overlap estimation generation system 106 can be implemented. As illustrated in FIG. 1, the environment 100 includes a server(s) 102, a network 108, client devices 110a-110n, and a data sample database 114.

Although the environment 100 of FIG. 1 is depicted as having a particular number of components, the environment 100 can have any number of additional or alternative components (e.g., a different number of servers, client devices, data sample databases, or other components in communication with the overlap estimation generation system 106 via the network 108). Similarly, although FIG. 1 illustrates a particular arrangement of the server(s) 102, the network 108, the client devices 110a-110n, and the data sample database 114, various additional arrangements are possible.

The server(s) 102, the network, 108, the client devices 110a-110n, and the data sample database 114 may be communicatively coupled with each other either directly or indirectly (e.g., through the network 108 as discussed in greater detail below in relation to FIG. 10). Moreover, the server(s) 102 and the client devices 110a-110n may include a variety of computing devices (including one or more computing devices as discussed in greater detail with relation to FIG. 10).

As mentioned above, the environment 100 includes the server(s) 102. In one or more embodiments, the server(s) 102 can store, receive, and/or transmit digital data, including overlap estimations for sets of data samples. To provide an illustration, in some instances, the server(s) 102 receive an indication or a selection of two sets of data samples from a client device (e.g., from one of the client devices 110a-110n). In response, the server(s) 102 transmit an overlap estimation for the sets of data samples to the client device. In one or more embodiments, the server(s) 102 comprises a data server. In some embodiments, the server(s) 102 comprises a communication server or a web-hosting server.

As shown in FIG. 1, the server(s) 102 include an analytics system 104. In one or more embodiments, the analytics system 104 collects, manages, and utilizes analytics data, such as data samples or data resulting from the analysis of sets of data samples. For example, in some implementations, the analytics system 104 collects data samples related to events (e.g., click events, purchases, subscriptions, etc.), data samples related to characteristics or attributes associated with client devices, or data samples related to products or services. The analytics system 104 collects the data samples in one or more ways. For example, in one or more embodiments, the analytics system 104 causes the server(s) 102 and/or a third-party network server (e.g., a server hosting a website or online service) to track data samples and report the tracked data samples for storage on a database. In one or more embodiments, the analytics system 104 receives data samples directly from the client devices 110a-110n via data stored thereon.

Additionally, the server(s) 102 includes the overlap estimation generation system 106. In particular, in one or more embodiments, the overlap estimation generation system 106 utilizes the server(s) 102 to generate overlap estimations for sets of data samples. For example, in some instances, the overlap estimation generation system 106 utilizes the server(s) 102 to determine, receive, or otherwise identify two sets of data samples and estimate the overlap between the sets of data samples.

To illustrate, in one or more embodiments, the overlap estimation generation system 106, via the server(s) 102, utilizes a sketching algorithm to generate a first sketch vector including a first set of bins for a first set of data samples and a second sketch vector including a second set of bins for a second set of data samples. The overlap estimation generation system 106, via the server(s) 102, further determines an equal bin similarity estimator, a lesser bin similarity estimator, and a greater bin similarity estimator based on comparisons between the first set of bins of the first sketch vector and the second set of bins of the second sketch vector. Via the server(s) 102, the overlap estimation generation system 106 generates an overlap estimation between the first set of data samples and the second set of data samples utilizing variance metrics corresponding to the equal bin similarity estimator, the lesser bin similarity estimator, and the greater bin similarity estimator. In some implementations, via the server(s) 102, the overlap estimation generation system 106 provides the overlap estimation for display via a client device.

In one or more embodiments, the data sample database 114 stores data samples. For example, in some implementations, the data sample database 114 stores data samples collected by the server(s) 102 (e.g., the overlap estimation generation system 106 via the server(s) 102). The data sample database 114 further provides access to the data samples to the overlap estimation generation system 106. Though FIG. 1 illustrates the data sample database 114 as a distinct component, one or more embodiments include the data sample database 114 as a component of the server(s) 102, the analytics system 104, or the overlap estimation generation system 106.

In one or more embodiments, the client devices 110a-110n include computing devices that are capable of receiving and/or displaying overlap estimations for sets of data samples. For example, in some implementations, the client devices 110a-110n include at least one of a smartphone, a tablet, a desktop computer, a laptop computer, a head-mounted-display device, or other electronic device. In some instances, the client devices 110a-110n include one or more applications (e.g., the client applications 112) that are capable of receiving and/or displaying overlap estimations for sets of data samples. For example, in some embodiments, the client application 112 includes a software application installed on the client devices 110a-110n. In other cases, however, the client application 112 includes a web browser or other application that accesses a software application hosted on the server(s) 102.

The overlap estimation generation system 106 can be implemented in whole, or in part, by the individual elements of the environment 100. Indeed, although FIG. 1 illustrates the overlap estimation generation system 106 implemented with regard to the server(s) 102, different components of the overlap estimation generation system 106 can be implemented by a variety of devices within the environment 100. For example, one or more (or all) components of the overlap estimation generation system 106 can be implemented by a different computing device (e.g., one of the client devices 110a-110n) or a separate server from the server(s) 102 hosting the analytics system 104. Example components of the overlap estimation generation system 106 will be described below with regard to FIG. 8.

Figure 2:
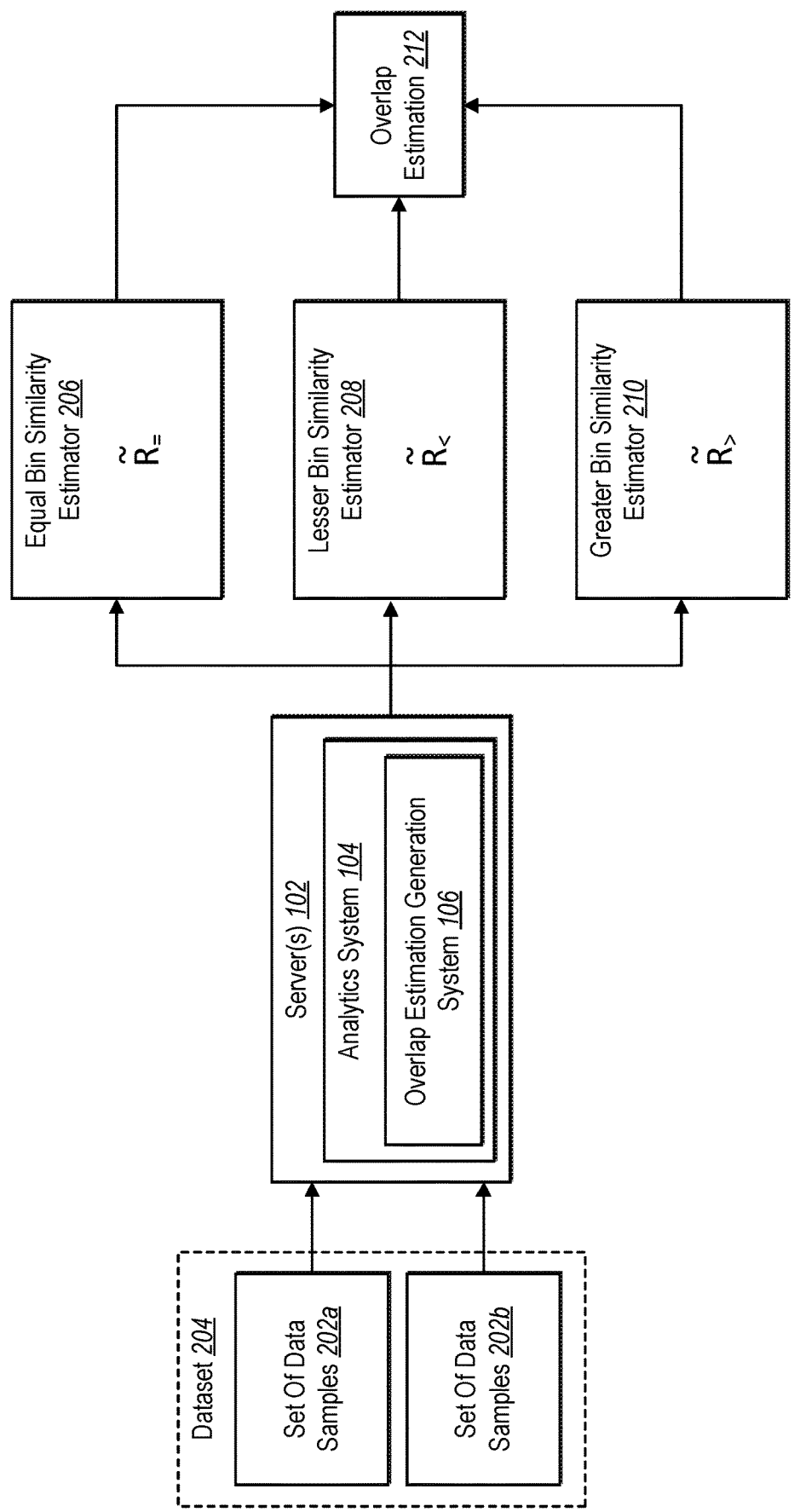
FIG. 2 illustrates a diagram of the overlap estimation generation system generating an overlap estimation for two sets of data samples in accordance with one or more embodiments.

As mentioned above, the overlap estimation generation system 106 generates overlap estimations for sets of data samples. FIG. 2 illustrates an overview diagram of the overlap estimation generation system 106 generating an overlap estimation for two sets of data samples in accordance with one or more embodiments.

As shown in FIG. 2, the overlap estimation generation system 106 determines (e.g., identifies) the set of data samples 202a and the set of data samples 202b. In particular, in one or more embodiments, the overlap estimation generation system 106 determines the sets of data samples 202a-202b by accessing a database storing the sets of data samples 202a-202b. For example, in some implementations, the overlap estimation generation system 106 maintains a database that stores sets of data samples for subsequent access. In some instances, the overlap estimation generation system 106 receives or retrieves the sets of data samples 202a-202b from another platform (e.g., a third-party system) that tracks/collects data samples.

Indeed, as illustrated in FIG. 2, the sets of data samples 202a-202b are part of a dataset 204. In particular, in one or more embodiments, the sets of data samples 202a-202b are subsets of the dataset 204. For instance, in some implementations, the set of data samples 202a corresponds to one characteristic or attribute of the data samples stored within the dataset 204 and the set of data samples 202b corresponds to another characteristic or attribute. In other words, the set of data samples 202a includes data samples associated with one characteristic or attribute represented in the dataset 204 and the set of data samples 202b includes data samples associated with another characteristic or attribute represented in the dataset 204.

Accordingly, in some implementations, an overlap exists between the set of data samples 202a and the set of data samples 202b. Indeed, as previously suggested, in one or more embodiments, a data sample is associated with multiple characteristics or attributes, such as where a data sample corresponds to a profile (e.g., a device profile or user profile associated with a client device) and includes digital data corresponding to the characteristics or attributes of the profile. As such, in some implementations, both the set of data samples 202a and the set of data samples 202b can include a given data sample from the dataset 204, such as when the given data sample includes data corresponding to the attribute of the set of data samples 202a as well as data corresponding to the attribute of the set of data samples 202b.

In some implementations, rather than determining the sets of data samples 202a-202b directly, the overlap estimation generation system 106 analyzes the dataset 204 and determines the sets of data samples 202a-202b accordingly. For example, in one or more embodiments, the overlap estimation generation system 106 analyzes the data samples of the dataset 204 and determines which data samples correspond to one attribute and which data samples correspond to another attribute. Accordingly, in some instances, the overlap estimation generation system 106 determines the sets of data samples 202a-202b while analyzing the dataset 204. In some implementations, the overlap estimation generation system 106 analyzes the dataset 204 using a sketching algorithm, such as a one permutation hashing algorithm.

As illustrated in FIG. 2, the overlap estimation generation system 106 generates an overlap estimation 212 for the sets of data samples 202a-202b. In particular, the overlap estimation generation system 106 generates the overlap estimation 212 using at least one of an equal bin similarity estimator 206, a lesser bin similarity estimator 208, or a greater bin similarity estimator 210.

To illustrate, in some instances, the overlap estimation generation system 106 generates sketch vectors (not shown) for the sets of data samples 202a-202b using a sketching algorithm, such as a one permutation hashing algorithm. For example, in at least one implementation, the overlap estimation generation system 106 generates the sketch vectors while analyzing the dataset 204 using the sketching algorithm. Generating sketch vectors will be discussed in more detail below with regard to FIG. 3.

Further, in some cases, the overlap estimation generation system 106 determines the equal bin similarity estimator 206, the lesser bin similarity estimator 208, and the greater bin similarity estimator 210 by comparing the sketch vectors. In particular, the overlap estimation generation system 106 compares the sets of bins of each sketch vector to determine whether a given bin one sketch vector has a bin value that is equal to, lesser than, or greater than the bin value of the corresponding bin of the other sketch vector. In some cases, the overlap estimation generation system 106 determines the equal bin similarity estimator 206, the lesser bin similarity estimator 208, and the greater bin similarity estimator 210 based on the comparisons.

Additionally, as shown in FIG. 2, the overlap estimation generation system 106 determines a final similarity estimator from the equal bin similarity estimator 206, the lesser bin similarity estimator 208, and the greater bin similarity estimator 210. For example, in some implementations, the overlap estimation generation system 106 selects one of the equal bin similarity estimator 206, the lesser bin similarity estimator 208, or the greater bin similarity estimator 210 as the final similarity estimator. In some cases, the overlap estimation generation system 106 combines two or more of the equal bin similarity estimator 206, the lesser bin similarity estimator 208, or the greater bin similarity estimator 210 to determine the final similarity estimator (e.g., use as the final similarity estimator). In some instances, the overlap estimation generation system 106 utilizes variance metrics corresponding to the equal bin similarity estimator 206, the lesser bin similarity estimator 208, and the greater bin similarity estimator 210 in determining which to use for the final similarity estimator.

In some implementations, the final similarity estimator indicates a measure of similarity between the sets of data samples 202a-202b. In one or more embodiments, the overlap estimation generation system 106 represents the similarity R between a first set of data samples $S_1$ and a second set of data samples $S_2$ as a Jaccard similarity where $R=J(S_1,S_2)$. Accordingly, the final similarity estimator provides an estimation for the similarity $\tilde{R}$.

In one or more embodiments, based on the estimation of similarity, the overlap estimation generation system 106 determines the overlap estimation 212 between the sets of data samples 202a-202b. Thus, the overlap estimation generation system 106 utilizes at least one of the equal bin similarity estimator 206, the lesser bin similarity estimator 208, or the greater bin similarity estimator 210 for determining the overlap estimation 212.

Figure 3:
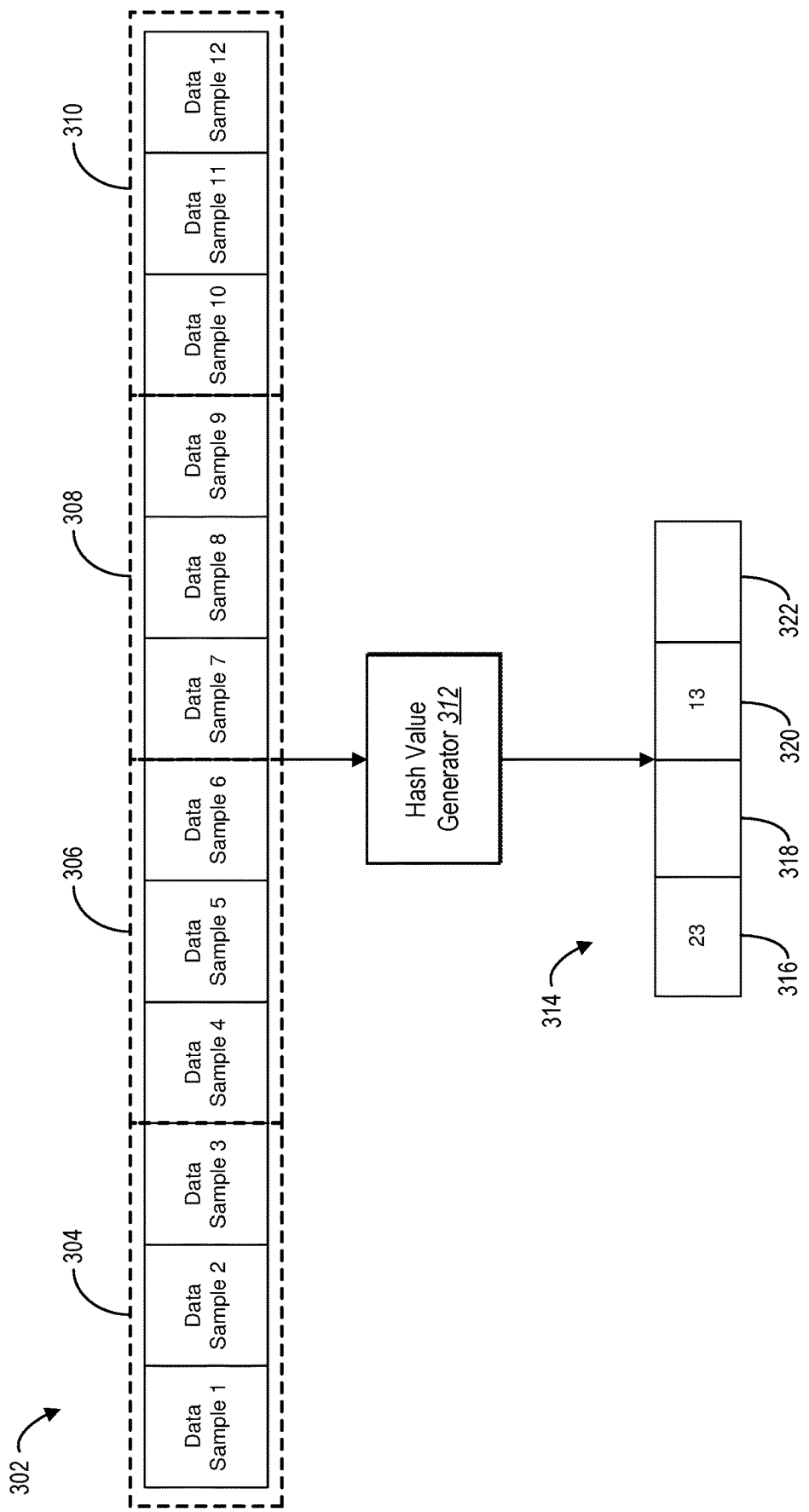
FIG. 3 illustrates a block diagram for generating a sketch vector for a set of data samples in accordance with one or more embodiments.

As mentioned above, in one or more embodiments, the overlap estimation generation system 106 generates sketch vectors for sets of data samples using a sketching algorithm. FIG. 3 illustrates a block diagram for generating a sketch vector for a set of data samples in accordance with one or more embodiments. Though FIG. 3 and the corresponding discussion reflect use of a one permutation hashing algorithm to generate a one permutation hashing vector, it should be noted that the overlap estimation generation system 106 can utilize other sketching algorithms in some embodiments.

Further, as discussed above, in one or more embodiments, the overlap estimation generation system 106 determines the data samples that make up a particular set of data samples while analyzing the dataset that includes the data samples. To illustrate, in some embodiments, the overlap estimation generation system 106 determines (e.g., receives, from a client device) a characteristic or attribute represented within a dataset. In response, the overlap estimation generation system 106 analyzes the dataset to determine which data samples are associated with the characteristic or attribute. In particular, in some implementations, the overlap estimation generation system 106 analyzes the dataset using a sketching algorithm to generate a sketch vector based on data samples within the dataset that are associated with the characteristic or attribute.

In one or more embodiments, to generate a sketch vector corresponding to a set of data samples using a one permutation hashing algorithm, the overlap estimation generation system 106 divides the dataset that includes the set of data samples into various regions. As an illustration, FIG. 3 shows the dataset 302 divided into a first region 304, a second region 306, a third region 308, and a fourth region 310, with each region including three data samples. The overlap estimation generation system 106 further uses a hash value generator 312 to generate hash values based on the data samples contained within one or more of the regions and uses the generated hash values to populate one or more bins of the sketch vector 314 corresponding to the set of data samples. In one or more embodiments, the sketch vector 314 includes a set of bins, where each bin corresponds to a region from the dataset 302. For example, as shown in FIG. 3, the first bin 316 corresponds to the first region 304, the second bin 318 corresponds to the second region 306, the third bin 320 corresponds to the third region 308, and the fourth bin 322 corresponds to the fourth region 310.

As mentioned previously, in one or more embodiments, a particular data sample includes an identifier (e.g., a device identifier indicating association of the data sample with a particular client device) and a plurality of attributes/characteristics associated with the identifier. In some embodiments, to generate a sketch vector for a particular set of data samples corresponding to a particular attribute/characteristic, the overlap estimation generation system 106 utilizes the hash value generator 312 to generate one or more hash values for a region based on whether that region includes a data sample associated with the attribute/characteristic. If the region includes a data sample associated with the attribute/characteristic, the overlap estimation generation system 106 utilizes the hash value generator 312 to generate a hash value for that region. In one or more embodiments, the hash value generator 312 generates the hash value by applying a hash function to the identifier of the data sample associated with the attribute/characteristic. The overlap estimation generation system 106 uses the resulting hash value to populate the bin of the sketch vector 314 corresponding to the region. As an example, FIG. 3 illustrates that the first bin 316 of the sketch vector 314 contains a value, indicating that at least one of the training samples of the first region 304 corresponded to the particular attribute/characteristic.

In one or more embodiments, if a region contains multiple data samples associated with the attribute/characteristic, the overlap estimation generation system 106 uses the hash value generator 312 to generate multiple hash values for that region (e.g., by applying the hash function to the identifier of each data sample associated with the attribute/characteristic). In some instances, the overlap estimation generation system 106 selects one of the hash values for the region uses the selected hash value to populate the bin of the sketch vector 314 that corresponds to that region. In one or more embodiments, the overlap estimation generation system 106 selects the lowest hash value (i.e., the minimum hash value) from among the multiple hash values.

In some embodiments, if a region does not contain any data samples associated with the particular attribute/characteristic, the overlap estimation generation system 106 does not generate any hash values for that region. Consequently, the bin corresponding to that region remains unpopulated. As an example, FIG. 3 shows the second bin 318 and the fourth bin 322 of the sketch vector 514 as unpopulated, indicating that the second region 306 and the fourth region 310 did not contain any data samples associated with the attribute/characteristic.

In one or more embodiments, the overlap estimation generation system 106 applies the one permutation hashing algorithm for each attribute/characteristic for which an overlap estimation is to be generated. In other words, the overlap estimation generation system 106 applies a hash function (e.g., the same hash function used to generate the sketch vector 314) to the identifiers of data samples corresponding to the attribute/characteristic for which a sketch vector is being generated and uses the resulting hash values to populate the bin of the sketch vector corresponding to the region containing those data samples. Thus, the overlap estimation generation system 106 determines a first set of data samples corresponding to a first attribute/characteristic and a second set of data samples corresponding to a second attribute/characteristic. Further, the overlap estimation generation system 106 generates a first sketch vector for the first set of data samples and a second sketch vector for the second set of data samples.

For example, in some implementations, the overlap estimation generation system 106 applies a one permutation hashing algorithm to generate sketch vectors as described in T. Mai, A. Rao, M. Kapilevich, R. A. Rossi, Y. Abbasi-Yadkori, and R. Sinha, "On densification for minwise hashing," in Proceedings of the 35th Conference on Uncertainty in Artificial Intelligence (UAI), 2019, which is incorporated by reference herein in its entirety.

Figure 4:
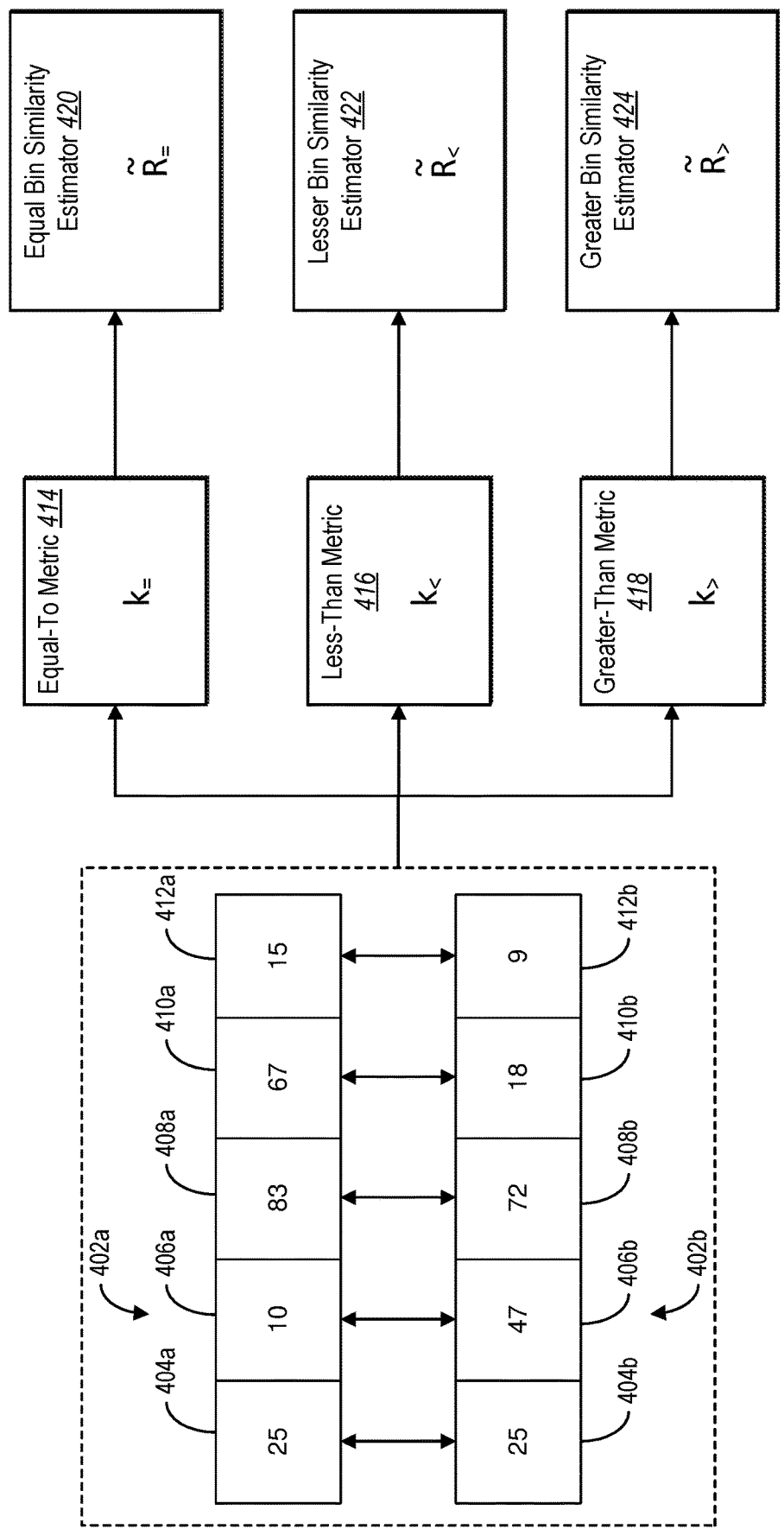
FIG. 4 illustrates a block diagram of determining similarity estimators by comparing the sketch vectors of sets of data samples in accordance with one or more embodiments.

As further mentioned above, the overlap estimation generation system 106 determines various similarity estimators based on comparisons between a first sketch vector for a first set of data samples and a second sketch vector for the second set of data samples. FIG. 4 illustrates a block diagram of determining similarity estimators by comparing the sketch vectors of sets of data samples in accordance with one or more embodiments.

As shown in FIG. 4, the overlap estimation generation system 106 compares a first sketch vector 402a for a first set of data samples and a second sketch vector 402b for a second set of data samples. In particular, each of the sketch vectors 402a-402b includes a set of bins that include bin values (e.g., the hash values generated by the sketching algorithm as discussed above with reference to FIG. 3). In one or more embodiments, the overlap estimation generation system 106 compares the first sketch vector 402a and the second sketch vector 402b by comparing the first set of bins of the first sketch vector 402a and the second set of bins of the second sketch vector 402b. In particular, the overlap estimation generation system 106 compares a given bin of the first sketch vector 402a with the corresponding bin of the second sketch vector 402b. For example, as shown in FIG. 4, the overlap estimation generation system 106 compares the first bin 404a of the first sketch vector 402a with the first bin 404b of the second sketch vector 402b, the second bin 406a with the second bin 406b, the third bin 408a with the third bin 408b, the fourth bin 410a with the fourth bin 410b, and the fifth bin 412a with the fifth bin 412b.

As shown in FIG. 4, the overlap estimation determines various metrics based on comparing the sets of bins of the first sketch vector 402a and the second sketch vector 402b. In particular, the overlap estimation generation system 106 determines the equal-to metric 414, the less-than metric 416, and the greater-than metric 418. In one or more embodiments, the overlap estimation generation system 106 determines the equal-to metric 414, the less-than metric 416, and the greater-than metric 418 by determining whether the bin value of a given bin of the first sketch vector 402a is equal to, less than, or greater than the bin value of the corresponding bin of the second sketch vector 402b. Indeed, in some implementations, the overlap estimation generation system 106 determines the equal-to metric 414 by determining a first subset of bins from the first sketch vector 402a having equal bin values to a corresponding first subset of bins from the second sketch vector 402b. Similarly, the overlap estimation generation system 106 determines the less-than metric 416 by determining a second subset of bins from the first sketch vector 402a having lesser bin values than a corresponding second subset of bins from the second sketch vector 402b. Likewise, the overlap estimation generation system 106 determines the greater-than metric 418 by determining a third subset of bins from the first sketch vector 402a having greater bin values than a corresponding third subset of bins from the second sketch vector 402b.

Indeed, in one or more embodiments, the overlap estimation generation system 106 determines the equal-to metric 414, the less-than metric 416, and the greater-than metric 418 as follows:

$$k_= = |\{i \in [k] : s_1(i) = s_2(i)\}| \tag{1}$$

$$k_< = |\{i \in [k] : s_1(i) < s_2(i)\}| \tag{2}$$

$$k_> = |\{i \in [k] : s_1(i) > s_2(i)\}| \tag{3}$$

In equations 1-3, $s_1$ represents a first sketch vector (e.g., the first sketch vector 402a) for a first set of data samples $S_1$, and $s_2$ represents a second sketch vector (e.g., the second sketch vector 402b) for a second set of data samples $S_2$.

Additionally, $k_=$ represents the equal-to metric 414, $k_<$ represents the less-than metric 416, and $k_>$ represents the greater-than metric 418. Further, i represents a bin index indicating the bin of the first sketch vector $s_1$ and the corresponding bin of the second sketch vector $s_2$ being compared.

As shown in FIG. 4, the overlap estimation generation system 106 determines similarity estimators based on the equal-to metric 414, the less-than metric 416, and the greater-than metric 418. In particular, the overlap estimation generation system 106 determines an equal bin similarity estimator 420 based on the equal-to metric 414, a lesser bin similarity estimator 422 based on the less-than metric 416, and a greater bin similarity estimator 424 based on the greater-than metric 418. For example, in some cases, the overlap estimation generation system 106 determines the equal bin similarity estimator 420, the lesser bin similarity estimator 422, and the greater bin similarity estimator 424, respectively, as follows:

$$\tilde{R}_= = \frac{k_=}{m} \quad (4)$$

$$\tilde{R}_< = \frac{f_1 - \frac{k_<}{m}(f_1+f_2)}{f_2} \quad (5)$$

$$\tilde{R}_> = \frac{f_2 - \frac{k_>}{m}(f_1+f_2)}{f_1} \quad (6)$$

In equations 4-6, $f_1=|S_1|$ (i.e., the size of the first set of data samples) and $f_2=|S_2|$ (i.e., the size of the second set of data samples). Indeed, as indicated by equations 5-6, in one or more embodiments, the overlap estimation generation system 106 determines the lesser bin similarity estimator 422 and the greater bin similarity estimator 424 based on the size of the first set of data samples and the second set of data samples.

Additionally, in equations 4-6, m represents the number of bins in which at least one of the sketch vectors is defined (e.g., is populated with a bin value). For example, in one or more embodiments, the overlap estimation generation system 106 traverses the sketch vectors for the sets of data samples, comparing pairs of bins from the sketch vectors (e.g., comparing a bin from one sketch vector to a corresponding bin of the other sketch vector). Based on comparing the pairs of bins, the overlap estimation generation system 106 determines the $k_=$, $k_<$, and $k_>$ values. Further, while traversing the sketch vectors, the overlap estimation generation system 106 determines whether a given pair of bins includes at least one bin that is defined (e.g., populated with a bin value). Upon determining that the given pair of bins includes at least one bin that is defined, the overlap estimation generation system 106 increments the value of m. In one or more embodiments, m represents the number of simultaneously non-empty bins.

In one or more embodiments, the equal bin similarity estimator 420 provided by equation 4 is the estimator for the Jaccard similarity $R=J(S_1,S_2)$. In some embodiments, the overlap estimation generation system 106 determines the lesser bin similarity estimator 422 provided by equation 5 and the greater bin similarity estimator 424 provided by equation 6 to approximate other aspects of similarity between the first set of data samples and the second set of data samples defined, respectively, as follows:

$$R_< = \frac{f_2 - a}{f} \quad (7)$$

$$R_> = \frac{f_1 - a}{f} \quad (8)$$

In equations 7-8, $\alpha=|S_1 \cap S_1|$, representing the intersection (e.g., the overlap) between the first set of data samples and the second set of data samples. Further, $f=f_1+f_2-a$, represents a measure of the union between the first set of data samples and the second set of data samples.

In one or more embodiments, the equal bin similarity estimator 420 is an unbiased estimator of the Jaccard similarity R. Further, in some implementations, the lesser bin similarity estimator 422 and the greater bin similarity estimator 424 are unbiased estimators of the Jaccard similarity R. For example, in one or more embodiments, the overlap estimation generation system 106 determines that the lesser bin similarity estimator 422 (and, by symmetry, the greater bin similarity estimator 424) is an unbiased estimator of the Jaccard similarity R based on the following where R=a/f:

$$E[\tilde{R}_<] = \frac{f_1}{f_2} - \frac{f_1+f_2}{f_2} E\left[\frac{k_<}{m}\right] \quad (9)$$

$$E\left[\frac{k_<}{m} \mid m\right] = \frac{f_1 - a}{f_1+f_2-a} = \frac{f_1 - f_2 R}{f_1+f_2} \quad (10)$$

Because $$E\left[\frac{k_<}{m} \mid m\right]$$

of equation 10 does not depend on m, $$E\left[\frac{k_<}{m}\right] = E\left[\frac{k_<}{m} \mid m\right] = \frac{f_1 - f_2 R}{f_1+f_2}.$$

Accordingly, in one or more embodiments, the overlap estimation generation system 106 plugs equation 10 into equation 9 to obtain the following:

$$E[\tilde{R}_<] = \frac{f_1}{f_2} - \frac{f_1+f_2}{f_2} \frac{f_1 - f_2 R}{f_1+f_2} = R \quad (11)$$

In one or more embodiments, the equal bin similarity estimator 420, the lesser bin similarity estimator 422, and the greater bin similarity estimator 424 are associated with variances defined, respectively, as follows:

$$\mathrm{Var}(\tilde{R}_=) = \mathrm{Var}\left(\frac{k_=}{m}\right) = R(1-R)\left(E\left[\frac{1}{m}\right]\left(1 + \frac{1}{f-1}\right) - \frac{1}{f-1}\right) \quad (12)$$

$$\mathrm{Var}(\tilde{R}_<) = R_<(1-R_<)\left(1 + \frac{f_1}{f_2}\right)^2 \left(E\left[\frac{1}{m}\right]\left(1 + \frac{1}{f-1}\right) - \frac{1}{f-1}\right) \quad (13)$$

$$\mathrm{Var}(\tilde{R}_>) = R_>(1-R_>)\left(1 + \frac{f_2}{f_1}\right)^2 \left(E\left[\frac{1}{m}\right]\left(1 + \frac{1}{f-1}\right) - \frac{1}{f-1}\right) \quad (14)$$

In one or more embodiments, the overlap estimation generation system 106 determines that equation 13 provides the variance for the lesser bin similarity estimator 422 (and, using a similar process, that equation 14 provides the variance for the greater bin similarity estimator 424) based on the following:

$$\mathrm{Var}\left(\frac{k_<}{m}\right) = R_<(1-R_<)\left(E\left[\frac{1}{m}\right]\left(1+\frac{1}{f-1}\right) - \frac{1}{f-1}\right) \quad (15)$$

Accordingly, in one or more embodiments, the overlap estimation generation system 106 uses the definition of $\tilde{R}_<$ provided by equation 5 to obtain the following:

$$\mathrm{Var}(\tilde{R}_<) = \left(1+\frac{f_2}{f_1}\right)^2 \mathrm{Var}\left(\frac{k_<}{m}\right) \quad (16)$$

It should be noted that, in one or more embodiments, $\mathrm{Var}(\tilde{R}_<) < \mathrm{Var}(\tilde{R})$ (where $\tilde{R}$ represents estimation for the similarity provided by the final similarity estimator) if and only if $$\frac{(f_1+f_2)^2}{f_2}(f_1 - a) < a(f_1 + f_2 - 2a).$$

Further, in one or more embodiments, $\mathrm{Var}(\tilde{R}_<) < \mathrm{Var}(\tilde{R}_>)$ if and only if $f_1 < f_2$.

Figure 5:
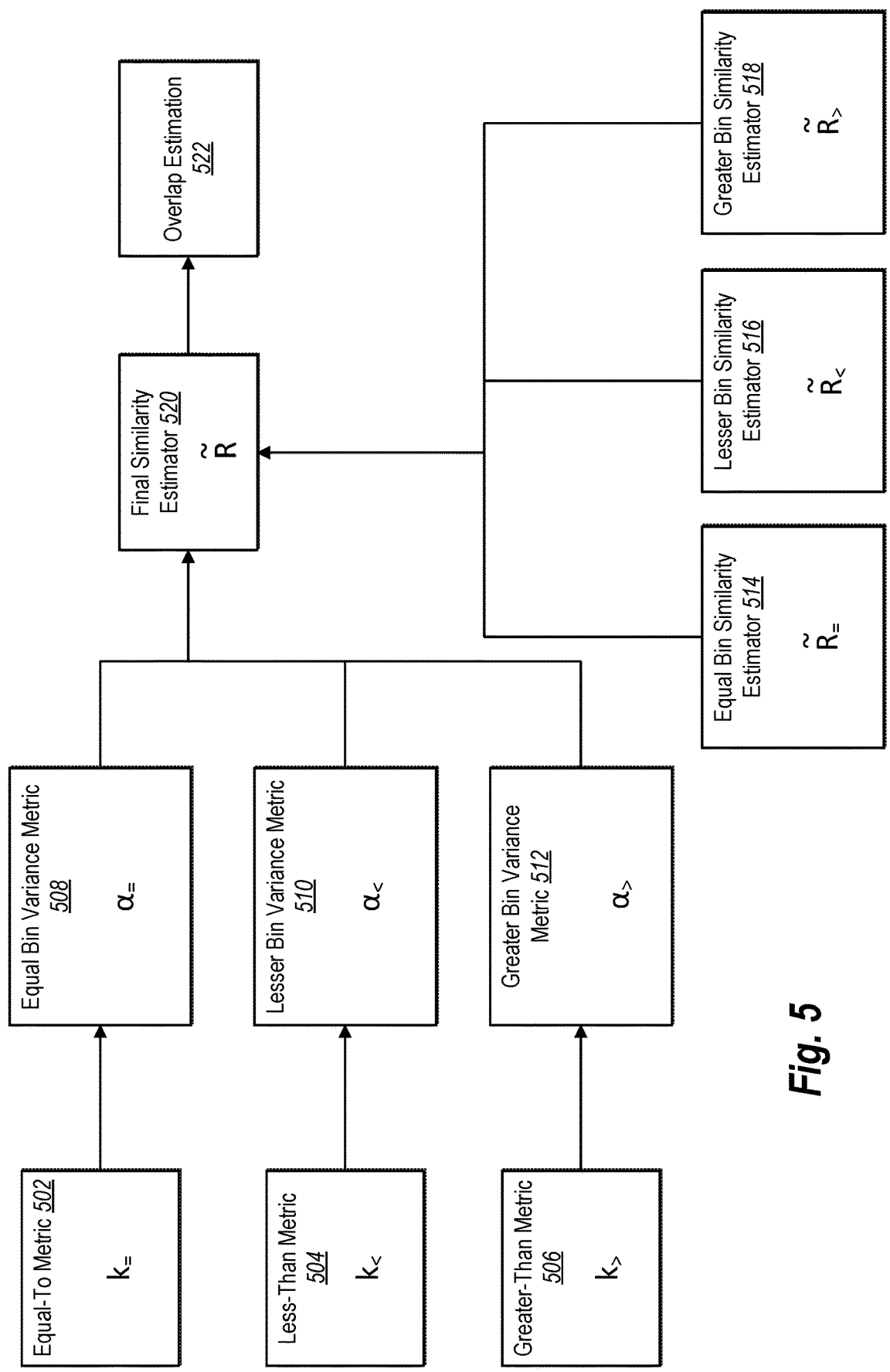
FIG. 5 illustrates a block diagram for generating an overlap estimation in accordance with one or more embodiments.

As discussed above, the overlap estimation generation system 106 generates an overlap estimation between the first set of data samples and the second set of data samples. FIG. 5 illustrates a block diagram for generating an overlap estimation in accordance with one or more embodiments.

In particular, as shown in FIG. 5, the overlap estimation generation system 106 determines an overlap estimation 522 between a first set of data samples and a second set of data samples using a final similarity estimator 520. As shown in FIG. 5, the overlap estimation generation system 106 determines the final estimator from the equal bin similarity estimator 514, the lesser bin similarity estimator 516, and/or the greater bin similarity estimator 518. As further shown in FIG. 5, the overlap estimation generation system 106 further determines the final similarity estimator 520 using one or more of an equal bin variance metric 508, a lesser bin variance metric 510, or a greater bin variance metric 512. In particular, the equal bin variance metric 508 indicates a measure of variance corresponding to the equal bin similarity estimator 514. Similarly, the lesser bin variance metric 510 indicates a measure of variance corresponding to the lesser bin similarity estimator 516. Likewise, the greater bin variance metric 512 indicates a measure of variance corresponding to the greater bin similarity estimator 518.

In one or more embodiments, the overlap estimation generation system 106 determines the equal bin variance metric 508, the lesser bin variance metric 510, and the greater bin variance metric 512. In particular, as shown in FIG. 5, the overlap estimation generation system 106 determines the equal bin variance metric 508, the lesser bin variance metric 510, and the greater bin variance metric 512 using the equal-to metric 502, the less-than metric 504, and the greater-than metric 506, respectively. Indeed, in one or more embodiments, the overlap estimation generation system 106 determines the equal bin variance metric 508, the lesser bin variance metric 510, and the greater bin variance metric 512 as follows, respectively:

$$\alpha_= = \frac{k_=}{m}\left(1 - \frac{k_=}{m}\right) \quad (17)$$

$$\alpha_< = \frac{k_<}{m}\left(1 - \frac{k_<}{m}\right)\left(1 + \frac{f_1}{f_2}\right)^2 \quad (18)$$

$$\alpha_> = \frac{k_>}{m}\left(1 - \frac{k_>}{m}\right)\left(1 + \frac{f_2}{f_1}\right)^2 \quad (19)$$

In one or more embodiments, by replacing $$\frac{k_=}{m}, \frac{k_<}{m}, \text{ and } \frac{k_>}{m}$$

with $\tilde{R}_=$, $\tilde{R}_<$, and $\tilde{R}_>$, respectively, the overlap estimation generation system 106 determines the following property:

$$\frac{\alpha_=}{\mathrm{Var}(\tilde{R}_=)} = \frac{\alpha_<}{\mathrm{Var}(\tilde{R}_<)} = \frac{\alpha_>}{\mathrm{Var}(\tilde{R}_>)} \quad (20)$$

As shown in equation 20, in one or more embodiments, the equal bin variance metric 508 is approximately proportional to a measure of variance corresponding to the equal bin similarity estimator 514. Similarly, the lesser bin variance metric 510 is approximately proportional to a measure of variance corresponding to the lesser bin similarity estimator 516. Likewise, the greater bin variance metric 512 is approximately proportional to a measure of variance corresponding to the greater bin similarity estimator 518.

In one or more embodiments, the overlap estimation generation system 106 determines the final similarity estimator 520 by selecting, as the final similarity estimator 520, the similarity estimator having the lowest-valued variance metric. For example, in some instances, the overlap estimation generation system 106 compares the equal bin variance metric 508, the lesser bin variance metric 510, and the greater bin variance metric 512 to determine the lowest-valued variance metric. Accordingly, the overlap estimation generation system 106 selects, as the final similarity estimator 520, one of the equal bin similarity estimator 514, the lesser bin similarity estimator 516, or the greater bin similarity estimator 518 based on the lowest-valued variance metric.

In some implementations, the overlap estimation generation system 106 determines the final similarity estimator 520 by combining two or more of the equal bin similarity estimator 514, the lesser bin similarity estimator 516, or the greater bin similarity estimator 518 based on their corresponding variance metric. For example, in some instances, the overlap estimation generation system 106 compares the equal bin variance metric 508, the lesser bin variance metric 510, and the greater bin variance metric 510 to determine a pair of lowest-valued variance metrics. Accordingly, the overlap estimation generation system 106 determines the final similarity estimator 520 by combining a pair of similarity estimators corresponding to the pair of lowest-valued variance metrics.

Further, in some cases, the overlap estimation generation system 106 combines the pair of similarity estimators using their corresponding variance metrics. For example, in some implementations, the overlap estimation generation system 106 generates weighted values for the pair of similarity estimators using their corresponding variance metrics. To illustrate, in one or embodiments, the overlap estimation generation system 106 combines the pair of similarity estimators to determine the final similarity estimator 520 as follows:

$$\tilde{R} = \frac{1/\alpha_X}{1/\alpha_X + 1/\alpha_Y}\tilde{R}_X + \frac{1/\alpha_Y}{1/\alpha_X + 1/\alpha_Y}\tilde{R}_Y \quad (21)$$

In equation 21, $\alpha_X$ and $\alpha_Y$ represent the two lowest-valued variance metrics, and $\tilde{R}_X$ and $\tilde{R}_Y$ represent the corresponding similarity estimators. As shown in equation 21, the overlap estimation generation system 106 generates the weighted values (e.g., the coefficients for the $\tilde{R}_X$ and $\tilde{R}_Y$ terms that are made up of the $\alpha_X$ and $\alpha_Y$ values), to be inversely proportional to the measures of variance corresponding to the included variance metrics. Accordingly, the overlap estimation generation system 106 associates a higher weighted value with the similarity estimator having the lower variance. Further, in one or more implementations because the final similarity estimator 520 is a combination of unbiased estimators, the final similarity estimator 520 is also an unbiased estimator.

In one or more embodiments, the overlap estimation generation system 106 confirms that the variance of the resulting final similarity estimator is confined within an upper bound. For example, in some cases, the overlap estimation generation system 106 determines the variance of the final similarity estimator 520 as the following:

$$\text{Var}(\tilde{R}) \leq \left(\frac{1+\gamma/\sqrt{\beta}}{1+\gamma}\right)^2 \text{Var}(\tilde{R}_X) \quad (22)$$

In equation 22, $\beta = \text{Var}(\tilde{R}_X)/\text{Var}(\tilde{R}_Y)$ and $\gamma = \alpha_X/\alpha_Y$. In particular, using $\gamma$, in one or more embodiments, the overlap estimation generation system 106 determines that:

$$\tilde{R} = \frac{1}{1+\gamma}\tilde{R}_X + \frac{\gamma}{1+\gamma}\tilde{R}_Y \quad (23)$$

Accordingly, the overlap estimation generation system 106 determines the variance of the final similarity estimator 520 as follows:

$$\text{Var}(\tilde{R}) = \left(\frac{1}{1+\gamma}\right)^2 \left(\text{Var}(\tilde{R}_X) + \gamma^2 \text{Var}(\tilde{R}_Y) + \right. \quad (24)$$

$$2\gamma \text{Cov}(\tilde{R}_X, \tilde{R}_Y)\Big) = \left(\frac{1}{1+\gamma}\right)^2 \text{Var}(\tilde{R}_X)\left(1 + \gamma^2 \frac{\text{Var}(\tilde{R}_Y)}{\text{Var}(\tilde{R}_X)} + \right.$$

$$\left. 2\gamma \frac{\text{Cov}(\tilde{R}_X, \tilde{R}_Y)}{\sqrt{\text{Var}(\tilde{R}_X)\text{Var}(\tilde{R}_Y)}} \sqrt{\frac{\text{Var}(\tilde{R}_Y)}{\text{Var}(\tilde{R}_X)}}\right) =$$

$$\left(\frac{1}{1+\gamma}\right)^2 \text{Var}(\tilde{R}_X)\left(1 + \gamma^2 \frac{1}{\beta} + 2\gamma \frac{1}{\sqrt{\beta}}\right) = \left(\frac{1+\gamma/\sqrt{\beta}}{1+\gamma}\right)^2 \text{Var}(\tilde{R}_X)$$

Thus, in some implementations, the overlap estimation generation system 106 confirms that the variance of the final similarity estimator is bounded by the upper limit provided by equation 22.

As further shown in FIG. 5, the overlap estimation generation system 106 generates the overlap estimation 522 between the first set of data samples and the second set of data samples based on the final similarity estimation 520. As previously discussed, in some implementations, the final similarity estimator 520 provides an estimate of the similarity $R = J(S_1, S_2)$ between the first set of data samples and the second set of data samples. Further, in some implementations, the overlap estimation generation system 106 determines that $R = \alpha/f$ where $\alpha$ represents the overlap (e.g., the intersection) between the sets of data samples and f represents a measure of the union between the sets of data samples. Accordingly, in some cases, the overlap estimation generation system 106 generates the overlap estimation 522 based on the final similarity estimator 520 and the measure of the union between the first set of data samples and the second set of data samples.

Accordingly, the overlap estimation generation system 106 operates more flexibly than conventional systems. Indeed, the overlap estimation generation system 106 flexibly determines the final similarity estimator 520 based on which of the equal bin similarity estimator 514, the lesser bin similarity estimator 516, and the greater bin similarity estimator 518 correspond to the lowest-valued variance metrics. In other words, the overlap estimation generation system 106 does not commit to using a fixed similarity estimator. Further, in one or more embodiments, the overlap estimation generation system 106 utilizes a final similarity estimator 520 that flexibly determines the similarity between sets of data samples based on information that goes beyond the matching bin values typically used by conventional systems.

Further, the overlap estimation generation system 106 operates more accurately and efficiently than conventional systems. Indeed, by generating an overlap estimation based on the additional information determined from the comparison of the sets of data samples, the overlap estimation generation system 106 more accurately determines the overlap between the sets of data samples. Further, by comparing sketch vectors generated from the sets of data samples, the overlap estimation generation system improves upon the error and sampling rates used by many conventional systems. Use of such an improved sampling routine and improved estimator further reduces the computation costs experienced by many conventional systems that rely on expensive join operations.

Thus, in one or more embodiments, the overlap estimation generation system 106 generates an overlap estimation between a first set of data samples and a second set of data samples. In particular, the overlap estimation generation system 106 generates the overlap estimation using at least one of an equal bin similarity estimator, a lesser bin similarity estimator, or a greater bin similarity estimator. Accordingly, in some embodiments, the algorithm and acts described with reference to FIG. 5 comprises the corresponding structure for performing a step for generating an overlap estimation between the first set of data samples and the second set of data samples.

Figure 6:
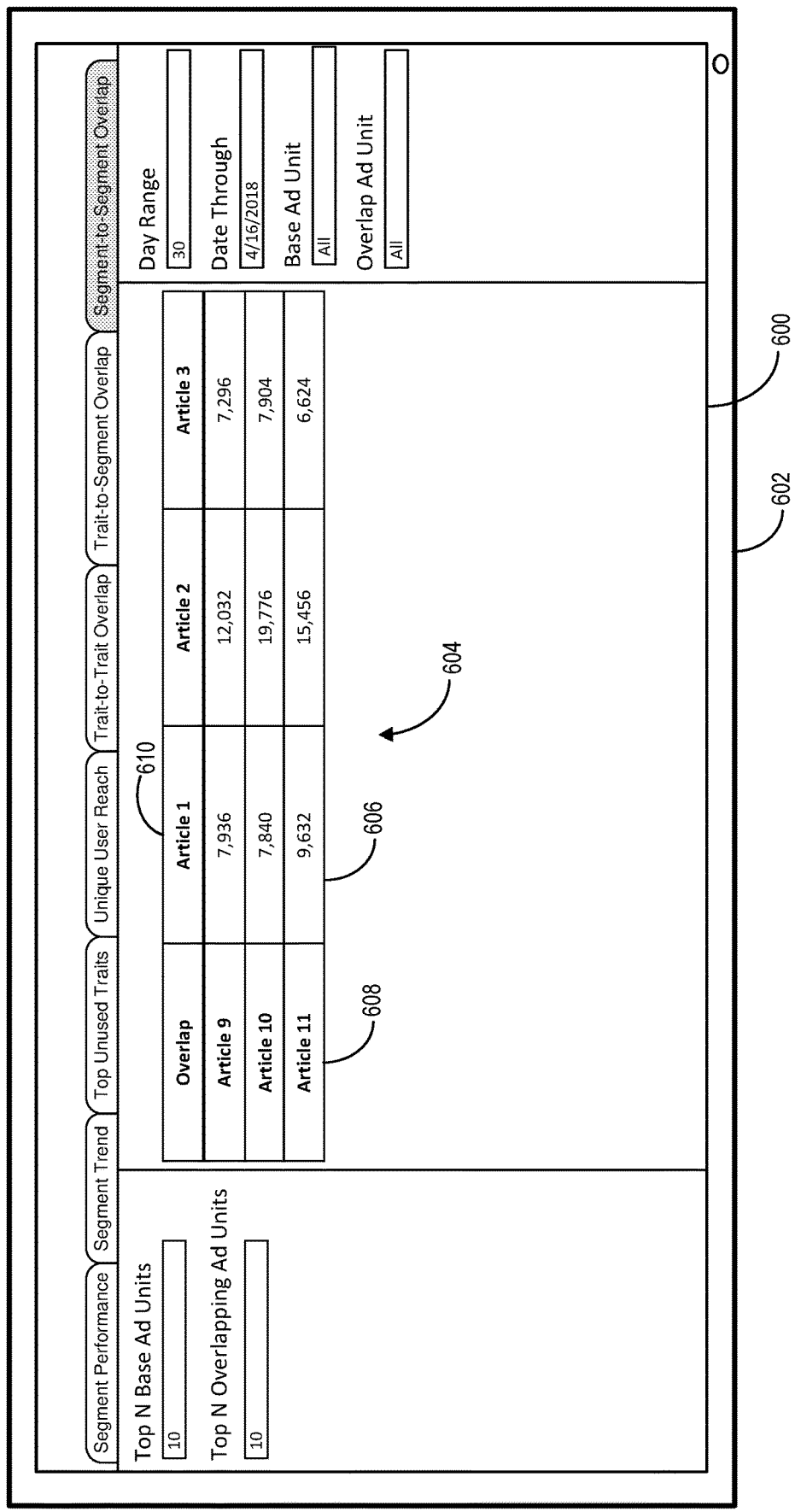
FIG. 6 illustrates a graphical user interface used by the overlap estimation generation system to display an overlap estimation between sets of data samples in accordance with one or more embodiments.

As mentioned above, in some implementations, the overlap estimation generation system 106 provides the overlap estimation between sets of data samples for display on a client device. FIG. 6 illustrates a graphical user interface used by the overlap estimation generation system 106 to display an overlap estimation between sets of data samples in accordance with one or more embodiments.

In particular, FIG. 6 illustrates a graphical user interface 600 used by the overlap estimation generation system 106 to display a visual element 604 representing the overlap estimation on a client device 602. Indeed, as shown in FIG. 6, the visual element 604 includes a table providing overlap estimations for various pairs of sets of data samples. In particular, FIG. 6 illustrates overlap estimations for different sets of data samples referred to as "Articles" (e.g., the overlap estimation between client device viewers of different digital content items). To illustrate, the visual element includes a visual indication 606 of an overlap estimation, a visual representation 608 of the corresponding first set of data samples, and a visual representation 610 of the corresponding second set of data samples.

In particular, based on user interaction with one or more data sets (e.g., user selection of one or more "Articles") the overlap estimation generation system 106 analyzes the selected datasets and determines an overlap estimation. The overlap estimation generation system 106 can receive user interaction with datasets in a variety of approaches. For example, the overlap generation system 106 can analyze data sets based on a ranking or criteria (e.g., the top ten datasets according to some metric, such as the most viewed digital content items). Similarly, the overlap generation system 106 can analyze data sets based on user interaction with each data set (e.g., selection of check boxes next to each base data set and target data set that a user seeks to analyze).

As further shown in FIG. 6, the overlap estimation generation system 106 can generate and provide, for display, a variety of overlap reports. For example, FIG. 6 illustrates the overlap estimation generation system 106 providing a "Segment-to-Segment Overlap" report (e.g., a number or percentage of users that overlap between audience segments) for display within the graphical user interface 600. But the overlap estimation generation system 106 can generate and provide numerous alternative overlap reports, such as a "Trait-to-Trait Overlap" report (e.g., a number or percentage of users that overlap between traits) or a "Trait-to-Segment Overlap" report (e.g., a number or percentage of users having a trait that also falls within a particular audience segment). In one or more implementations, the overlap estimation generation system 106 utilizes the various overlap reports to show the different ways in which sets of data samples can overlap. In one or more embodiments, the overlap estimation generation system 106 generates and provides an overlap report for display in response to detecting a user interaction with the corresponding tab within the graphical user interface 600 via the client device 602.

As indicated, FIG. 6 shows the visual element 604 as a table including visual representations of the sets of data samples and the overlap estimation; however, the overlap estimation generation system 106 can provide other visual elements in various embodiments. For example, in some embodiments, the overlap estimation generation system 106 provides a pair of overlapping circles representing the sets of data samples (e.g., one circle per set of data samples), where the amount of overlap between the circles represents the corresponding overlap estimation.

As further shown in FIG. 6, in some instances, the overlap estimation generation system 106 provides, for display via the graphical user interface 600, various options for modifying the overlap analysis. To illustrate, the overlap estimation generation system 106 provides options that allow the client device 602 to modify the dates or data range associated with the data samples that will be analyzed. In some cases, the overlap estimation generation system 106 detects selections made by the client device via the provided options and modifies the overlap analysis accordingly.

As mentioned above, in one or more embodiments, the overlap estimation generation system 106 operates more accurately than conventional systems. Researchers have conducted studies to determine the accuracy of at least one embodiment of the overlap estimation generation system 106. FIGS. 7A-7D illustrate graphs reflecting experimental results regarding the effectiveness of the overlap estimation generation system 106 in accordance with one or more embodiments. In particular, the graphs shown in FIGS. 7A-7D compare the performance of one embodiment of the overlap estimation generation system 106 (labeled "Ours") with the performance of at least one conventional system using join operations (labeled "Baseline"). The tables provide the error rates in various scenarios. In each experiment, the researchers set the size of the sketch vectors for the sets of data samples equal to ten thousand.

Figure 7A:
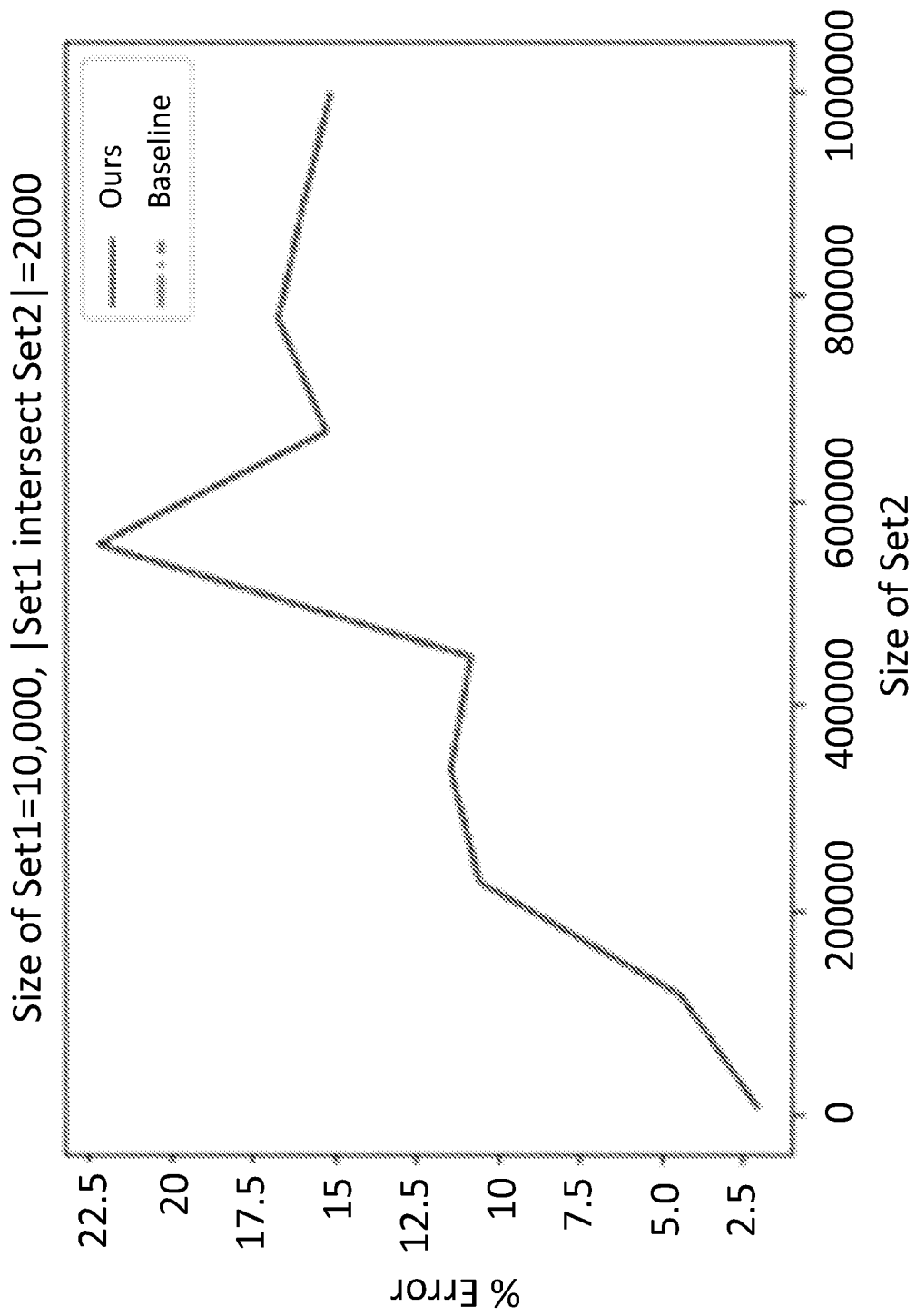
FIGS. 7A-7D illustrate graphs reflecting experimental results regarding the effectiveness of the overlap estimation generation system in accordance with one or more embodiments.
Figure 7B:
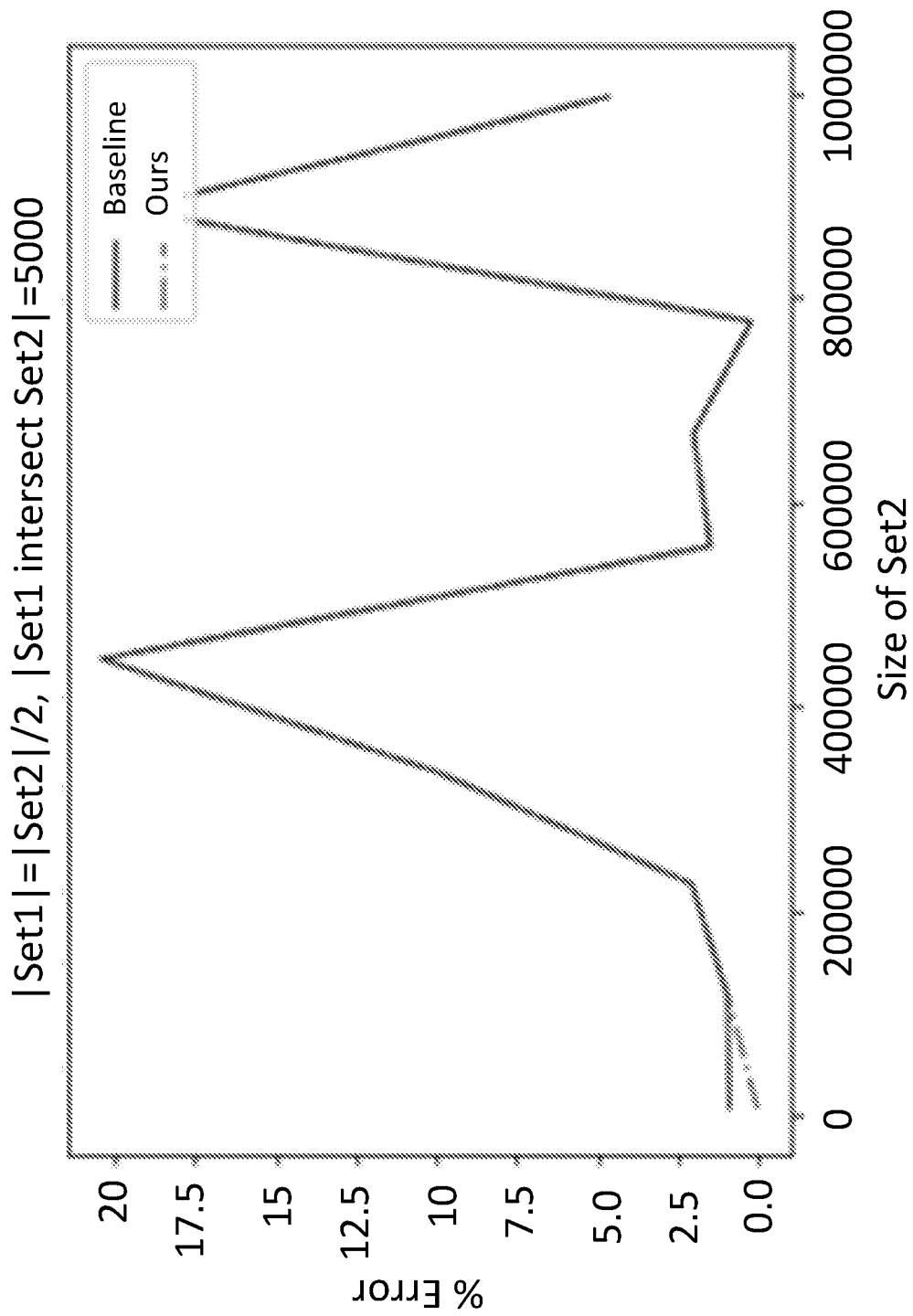

Specifically, the graph of FIG. 7A compares the performance of each tested model when the first set of data samples has a fixed size and the second set of data samples varies in size. As illustrated in FIG. 7A, the researchers set the overlap between the first set of data samples and the second of data samples to include two thousand data samples. The graph of FIG. 7B compares the performance of each tested model when the size of both sets of data samples varies. In particular, as shown in FIG. 7B, the size of the first set of data samples was set to about half of the size of the second set of data samples. Further, the researchers set the overlap to include five thousand data samples. As shown by the graphs of FIGS. 7A-7B, the overlap estimation generation system 106 provides a very similar performance as the other tested model—almost indistinguishable from the other tested model.

Figure 7C:
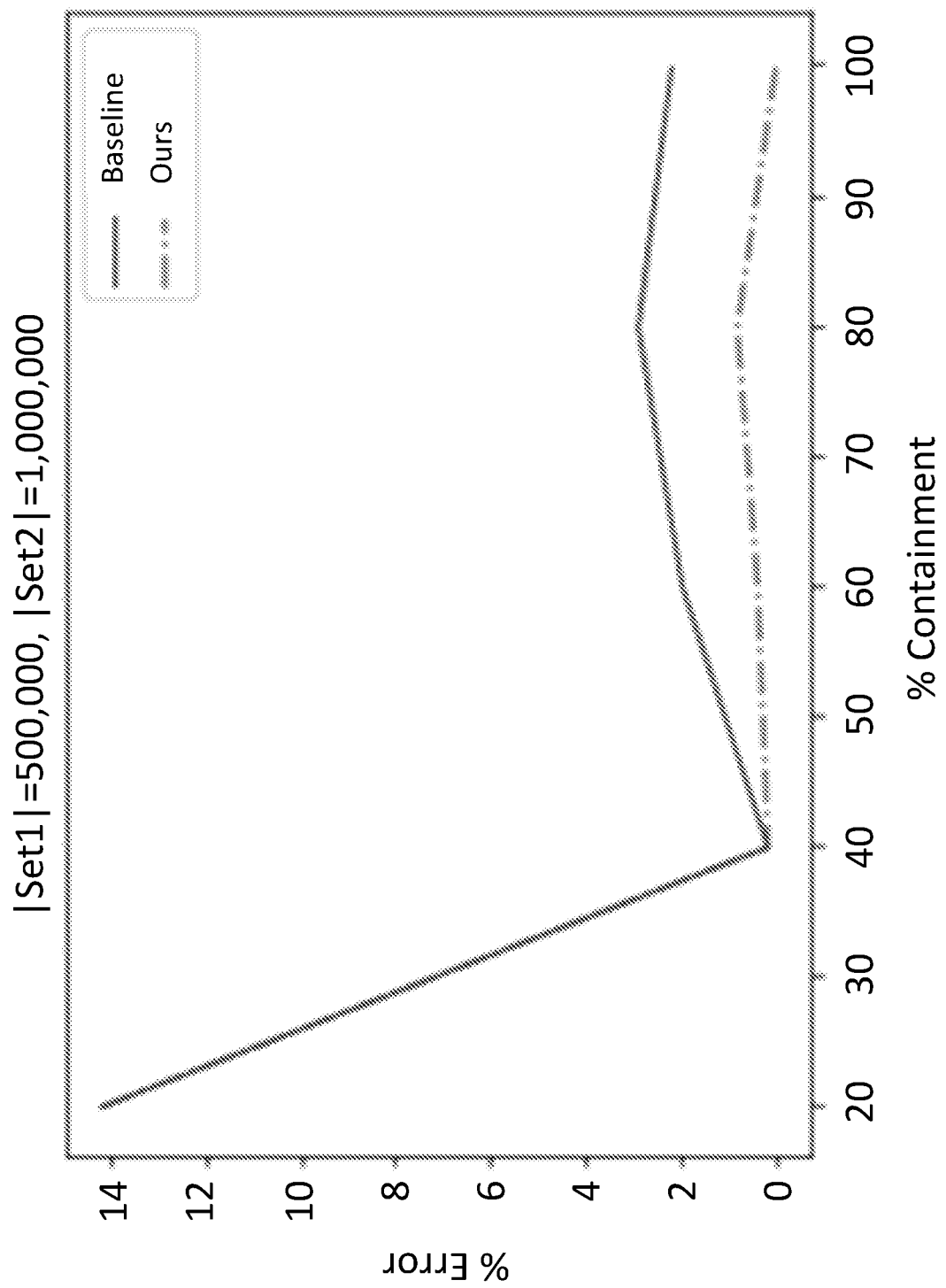

The graph of 7C compares the performance of each tested model when the size of both sets of data samples are fixed. Further, as shown in FIG. 7C, the researchers varied the amount by which the first set of data samples was contained within the second set of data samples (e.g., the amount of overlap). As shown by the graph, while the containment was less than 40%, the overlap estimation generation system 106 provides similar performance to the other tested model. 40%, the overlap estimation generation system 106 performed significantly better, providing much lower error rates. Thus, the overlap estimation generation system 106 provides improved accuracy particularly when one set of data samples is contained significantly within the other set of data samples.

Figure 7D:
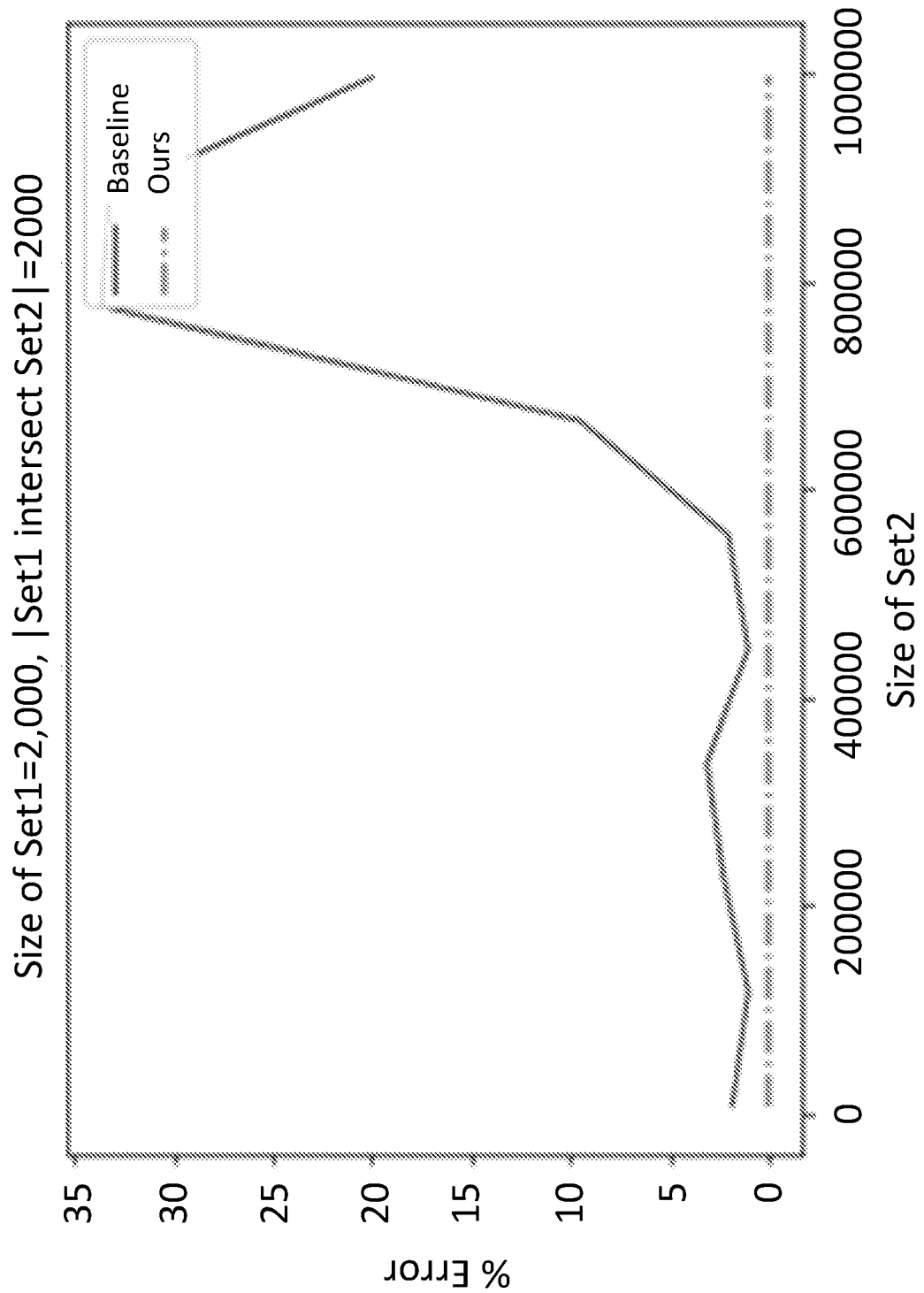

The graph of FIG. 7D compares the performance of each tested model when the first set of data samples is completely contained within the second set of data sample and the size of the second set of data samples varies. As shown by the graph, the overlap estimation generation system 106 performs significantly better than the other tested model regardless of the size of the second set of data samples. However, as the size of the second set of data samples increases, so does the contrast between the performances of the two models.

Figure 8:
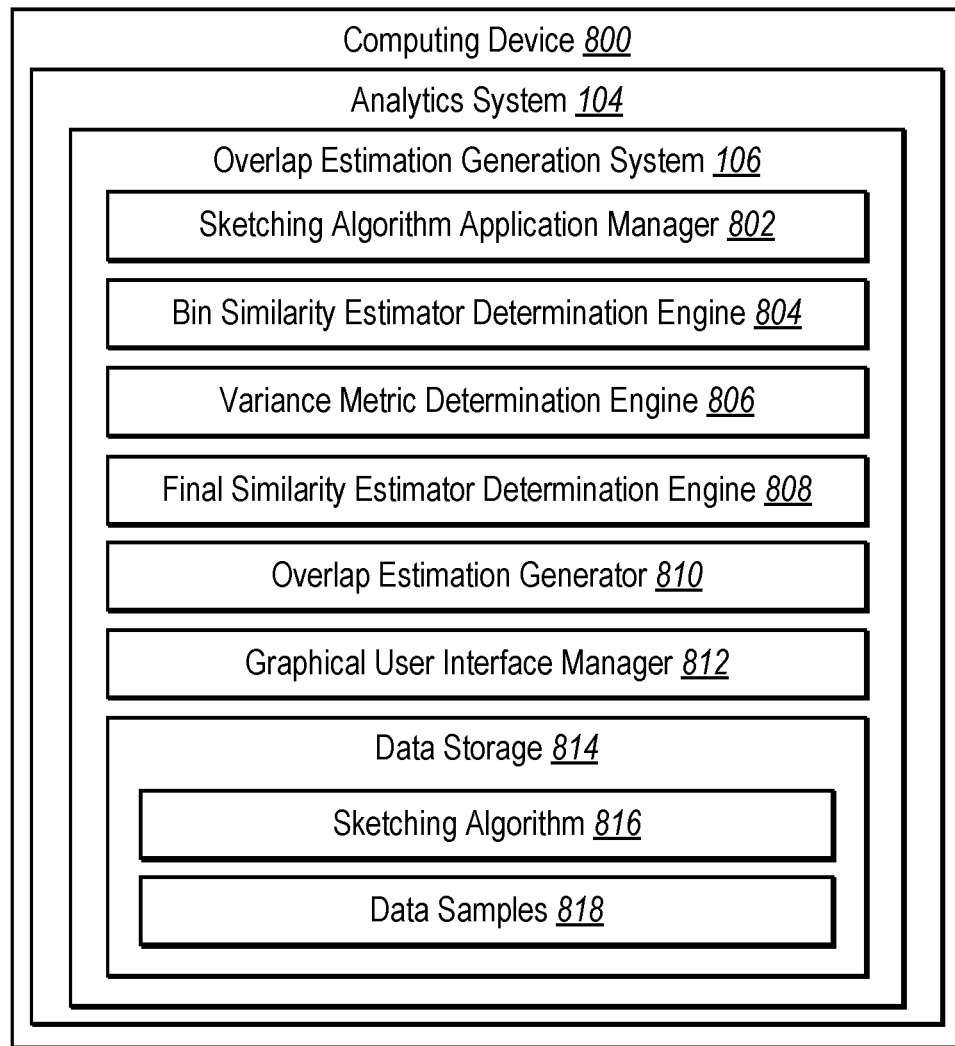
FIG. 8 illustrates an example schematic diagram of an overlap estimation generation system in accordance with one or more embodiments.

Turning now to FIG. 8, additional detail will now be provided regarding various components and capabilities of the overlap estimation generation system 106. In particular, FIG. 8 illustrates the overlap estimation generation system 106 implemented by the computing device 800 (e.g., the server(s) 102 and/or one of the client devices 110*a*-110*n* discussed above with reference to FIG. 1). Additionally, the overlap estimation generation system 106 is also part of the analytics system 104. As shown, in one or more embodiments, the overlap estimation generation system 106 includes, but is not limited to, a sketching algorithm application manager 802, a bin similarity estimator determination engine 804, a variance metric determination engine 806, a final similarity estimator determination engine 808, an overlap estimation generator 810, a graphical user interface manager 812, and data storage 814 (which includes a sketching algorithm 816 and data samples 818).

As just mentioned, and as illustrated in FIG. 8, the overlap estimation generation system 106 includes the sketching algorithm application manager 802. In one or more embodiments, the sketching algorithm application manager 802 utilizes a sketching algorithm to generate sketch vectors for sets of data samples. For example, in some implementations, the sketching algorithm application manager 802 utilizes a sketching algorithm to generate a first sketch vector that includes a first set of bins for a first set of data samples and a second sketch vector that includes a second set of bins for a second set of data samples. In some implementations, the sketching algorithm application manager 802 utilizes a one permutation hashing algorithm to generate one permutation hashing vectors for the sets of data samples.

Additionally, as shown in FIG. 8, the overlap estimation generation system 106 includes the bin similarity estimator determination engine 804. In one or more embodiments, the bin similarity estimator determination engine 804 compares the sketch vectors for sets of data samples generated by the sketching algorithm application manager 802. In particular, the bin similarity estimator determination engine 804 compares the sets of bins of the sketch vectors. Based on the comparison, the bin similarity estimator determination engine 804 determines an equal bin similarity estimator, a lesser bin similarity estimator, and a greater bin similarity estimator.

Further, as shown in FIG. 8, the overlap estimation generation system 106 includes the variance metric determination engine 806. In one or more embodiments, the variance metric determination engine 806 determines variance metrics that correspond to the equal bin similarity estimator, the lesser bin similarity estimator, and the greater bin similarity estimator determined by the bin similarity estimator determination engine 804. For example, in some implementations, the variance metric determination engine 806 determines an equal bin variance metric indicating a measure of variance corresponding to the equal bin similarity estimator. Similarly, the variance metric determination engine 806 determines a lesser bin variance metric indicating a measure of variance corresponding to the lesser bin similarity estimator. Likewise, the variance metric determination engine 806 determines a greater bin variance metric indicating a measure of variance corresponding to the greater bin similarity estimator.

As shown in FIG. 8, the overlap estimation generation system 106 also includes the final similarity estimator determination engine 808. In one or more embodiments, the final similarity estimator determination engine 808 determines a final similarity estimator from the equal bin similarity estimator, the lesser bin similarity estimator, and the greater bin similarity estimator. For example, in some implementations, the final similarity estimator determination engine 808 determines the final similarity estimator based on a comparison of the corresponding variance metrics. In some instances, the final similarity estimator determination engine 808 selects one of the equal bin similarity estimator, the lesser bin similarity estimator, or the greater bin similarity estimator as the final similarity estimator. In some cases, the final similarity estimator determination engine 808 combines two or more of the equal bin similarity estimator, the lesser bin similarity estimator, or the greater bin similarity estimator using the corresponding variance metrics to determine associated weighted values. In some instances, the final similarity estimator indicates a measure of similarity between sets of data samples.

As shown in FIG. 8, the overlap estimation generation system 106 further includes the overlap estimation generator 810. In one or more embodiments, the overlap estimation generator 810 generates an overlap estimation between the sets of data samples based on the final similarity estimator. In some implementations, the overlap estimation generator 810 further generates the overlap estimation based on a measure of a union between the sets of data samples.

Additionally, as shown in FIG. 8, the overlap estimation generation system 106 includes the graphical user interface manager 812. In one or more embodiments, the graphical user interface manager 812 provides the overlap estimation for display via a client device (e.g., within a graphical user interface displayed on the client device). In some implementations, the graphical user interface manager 812 further provides the overlap estimation for display in relation to visual representations of the sets of data samples.

Further, as shown in FIG. 8, the overlap estimation generation system 106 includes data storage 814. In particular, data storage 814 includes the sketching algorithm 816 and data samples 818. In one or more embodiments, the sketching algorithm 816 stores the sketching algorithm utilized by the sketching algorithm application manager 802 to generate sketch vectors for sets of data samples. In some implementations, data samples 818 stores the sets of data samples for which the overlap estimation generation system 106 generates an overlap estimation. For example, in some cases, data samples 818 stores a dataset that includes data samples associated with various attributes or characteristics.

Each of the components 802-818 of the overlap estimation generation system 106 can include software, hardware, or both. For example, the components 802-818 can include one or more instructions stored on a computer-readable storage medium and executable by processors of one or more computing devices, such as a client device or server device. When executed by the one or more processors, the computer-executable instructions of the overlap estimation generation system 106 can cause the computing device(s) to perform the methods described herein. Alternatively, the components 802-818 can include hardware, such as a special-purpose processing device to perform a certain function or group of functions. Alternatively, the components 802-818 of the overlap estimation generation system 106 can include a combination of computer-executable instructions and hardware.

Furthermore, the components 802-818 of the overlap estimation generation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-818 of the overlap estimation generation system 106 may be implemented as a stand-alone application, such as a desktop or mobile application. Furthermore, the components 802-818 of the overlap estimation generation system 106 may be implemented as one or more web-based applications hosted on a remote server. Alternatively, or additionally, the components 802-818 of the overlap estimation generation system 106 may be implemented in a suite of mobile device applications or "apps." For example, in one or more embodiments, the overlap estimation generation system 106 can comprise or operate in connection with digital software applications such as ADOBE® AUDI- ENCE MANAGER, ADOBE® ANALYTICS, or ADOBE® CAMPAIGN. The foregoing are either registered trademarks or trademarks of Adobe Inc. in the United States and/or other countries.

Figure 9:
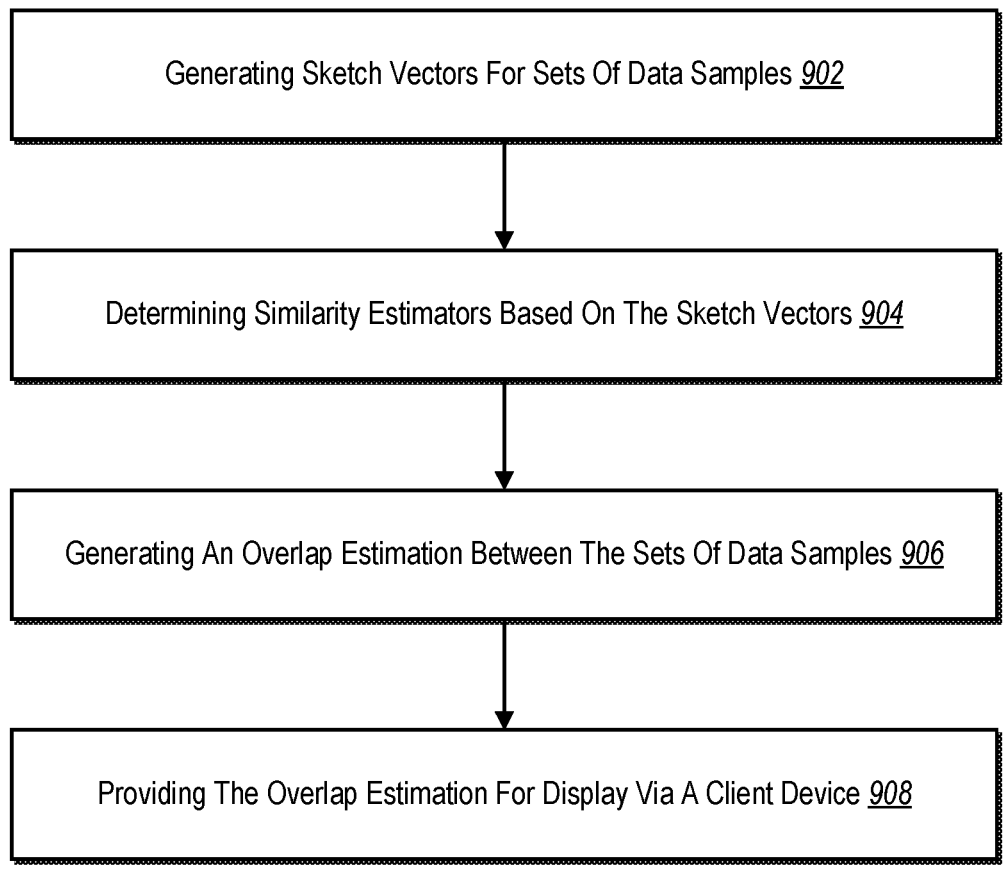
FIG. 9 illustrates a flowchart of a series of acts for generating an overlap estimation between a first set of data samples and a second set of data samples in accordance with one or more embodiments.

FIGS. 1-8, the corresponding text and the examples provide a number of different methods, systems, devices, and non-transitory computer-readable media of the overlap estimation generation system 106. In addition to the foregoing, one or more embodiments can also be described in terms of flowcharts comprising acts for accomplishing particular results, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for generating an overlap estimation between a first set of data samples and a second set of data samples in accordance with one or more embodiments. While FIG. 9 illustrates acts according to one embodiment, alternative embodiments may omit, add to, reorder, and/or modify any of the acts shown in FIG. 9. In some implementations, the acts of FIG. 9 are performed as part of a method. For example, in some embodiments, the acts of FIG. 9 are performed as part of a computer-implemented method for efficiently determining amounts of overlap between digital data repositories. In some instances, a non-transitory computer-readable medium stores instructions thereon that, when executed by at least one processor, cause a computing device to perform the acts of FIG. 9. In some implementations, a system performs the acts of FIG. 9. For example, in one or more cases, a system includes one or more memory devices comprising a first set of data samples, a second set of data samples, and a sketching algorithm. The system further includes one or more server devices configured to cause the system to perform the acts of FIG. 9.

The series of acts 900 includes an act 902 of generating sketch vectors for sets of data samples. For example, in one or more embodiments, the act 902 involves determining an estimated amount of overlap between a first set of data samples and a second set of data samples by generating, utilizing a sketching algorithm, a first sketch vector comprising a first set of bins for the first set of data samples and a second sketch vector comprising a second set of bins for the second set of data samples.

In some instances, the overlap estimation generation system 106 generates, utilizing the sketching algorithm, the first sketch vector comprising the first set of bins for the first set of data samples and the second sketch vector comprising the second set of bins for the second set of data samples by generating, utilizing a one permutation hashing algorithm, a first one permutation hashing vector comprising the first set of bins for the first set of data samples and a second one permutation hashing vector comprising the second set of bins for the second set of data samples.

Indeed, in one or more embodiments, the overlap estimation generation system 106 generates a first sketch vector for a first set of data samples and a second sketch vector for a second set of data samples. In some implementations, generating the first sketch vector for the first set of data samples and the second sketch vector for the second set of data samples comprises generating a first one permutation hashing vector comprising hash values corresponding to the first set of data samples and a second one permutation hashing vector comprising hash values corresponding to the second set of data samples.

In some embodiments, the overlap estimation generation system 106 generates, utilizing the sketching algorithm, the first sketch vector comprising the first set of bins for the first set of data samples and the second sketch vector comprising the second set of bins for the second set of data samples by generating the first sketch vector for the first set of data samples corresponding to a first distribution segment trait and the second sketch vector for the second set of data samples corresponding to a second distribution segment trait. For example, in one or more embodiments, the overlap estimation generation system 106 generates, utilizing the sketching algorithm, the first sketch vector comprising the first set of bins for the first set of data samples and the second sketch vector comprising the second set of bins for the second set of data samples by: generating a first one permutation hashing vector utilizing a one permutation hashing algorithm to populate the first set of bins with bin values corresponding to a first distribution segment trait; and generating a second one permutation hashing vector utilizing the one permutation hashing algorithm to populate the second set of bins with bin values corresponding to a second distribution segment trait.

The series of acts 900 also includes an act 904 of determining similarity estimators based on the sketch vectors. For example, in one or more embodiments, the act 904 involves determining the estimated amount of overlap between a first set of data samples and a second set of data samples by further determining an equal bin similarity estimator, a lesser bin similarity estimator, and a greater bin similarity estimator based on comparisons between the first set of bins of the first sketch vector and the second set of bins of the second sketch vector. In other words, in some instances, the overlap estimation generation system 106 determines the equal bin similarity estimator, the lesser bin similarity estimator, and the greater bin similarity estimator based on a comparison between the first sketch vector and the second sketch vector.

In some implementations, the overlap estimation generation system 106 determines the equal bin similarity estimator, the lesser bin similarity estimator, and the greater bin similarity estimator by comparing the first set of bins of the first sketch vector and the second set of bins of the second sketch vector to determine whether a bin value of a given bin from the first set of bins is equal to, less than, or greater than a bin value of a corresponding bin from the second set of bins. In other words, in some instances, the overlap estimation generation system 106 determines the equal bin similarity estimator, the lesser bin similarity estimator, and the greater bin similarity estimator based on the comparison between the first sketch vector and the second sketch vector comprises determining the equal bin similarity estimator, the lesser bin similarity estimator, and the greater bin similarity estimator based on bin values of the first sketch vector that are equal to, lesser than, or greater than corresponding bin values of the second sketch vector.

Indeed, in one or more embodiments, the overlap estimation generation system 106 determines the equal bin similarity estimator based on the comparisons between the first set of bins of the first sketch vector and the second set of bins of the second sketch vector by determining a first subset of bins from the first set of bins having equal bin values to a corresponding first subset of bins from the second set of bins. Additionally, the overlap estimation generation system 106 determines the lesser bin similarity estimator based on the comparisons between the first set of bins of the first sketch vector and the second set of bins of the second sketch vector by determining a second subset of bins from the first set of bins having lesser bin values than a corresponding second subset of bins from the second set of bins. Similarly, the overlap estimation generation system 106 determines the greater bin similarity estimator based on the comparisons between the first set of bins of the first sketch vector and the second set of bins of the second sketch vector by determining a third subset of bins from the first set of bins having greater bin values than a corresponding third subset of bins from the second set of bins.

In other words, in one or more embodiments, the overlap estimation generation system 106 determines the equal bin similarity estimator by determining a first subset of bins from the first set of bins having equal bin values to a corresponding first subset of bins from the second set of bins; determines the lesser bin similarity estimator by determining a second subset of bins from the first set of bins having lesser bin values than a corresponding second subset of bins from the second set of bins; and determines the greater bin similarity estimator by determining a third subset of bins from the first set of bins having greater bin values than a corresponding third subset of bins from the second set of bins.

In some implementations, the overlap estimation generation system 106 determines a size of the first set of data samples and a size of the second set of data samples. Accordingly, the overlap estimation generation system 106 determines the lesser bin similarity estimator and the greater bin similarity estimator based on the comparisons between the first set of bins of the first sketch vector and the second set of bins of the second sketch vector, the size of the first set of data samples, and the size of the second set of data samples.

Further, the series of acts 900 includes an act 906 of generating an overlap estimation between the sets of data samples. For example, in one or more embodiments, the act 906 involves determining the estimated amount of overlap between a first set of data samples and a second set of data samples by further generating an overlap estimation between the first set of data samples and the second set of data samples utilizing variance metrics corresponding to the equal bin similarity estimator, the lesser bin similarity estimator, and the greater bin similarity estimator.

In one or more embodiments, the overlap estimation generation system 106 determines the variance metrics corresponding to the equal bin similarity estimator, the lesser bin similarity estimator, and the greater bin similarity estimator. For example, in at least one implementation, the overlap estimation generation system 106 determines the variance metrics corresponding to the equal bin similarity estimator, the lesser bin similarity estimator, and the greater bin similarity estimator by determining an equal bin variance metric indicating a measure of variance corresponding to the equal bin similarity estimator, a lesser bin variance metric indicating a measure of variance corresponding to the lesser bin similarity estimator, and a greater bin variance metric indicating a measure of variance corresponding to the greater bin similarity estimator.

In some cases, the overlap estimation generation system 106 generates the overlap estimation between the first set of data samples and the second set of data samples utilizing the variance metrics corresponding to the equal bin similarity estimator, the lesser bin similarity estimator, and the greater bin similarity estimator by: selecting at least one of the equal bin similarity estimator, the lesser bin similarity estimator, and the greater bin similarity estimator by comparing the equal bin variance metric, the lesser bin variance metric, and the greater bin variance metric; and determining the overlap estimation from the at least one of the equal bin similarity estimator, the lesser bin similarity estimator, and the greater bin similarity estimator.

In some implementations, the overlap estimation generation system 106 generates the overlap estimation between the first set of data samples and the second set of data samples utilizing the variance metrics corresponding to the equal bin similarity estimator, the lesser bin similarity estimator, and the greater bin similarity estimator by: generating weighted values based on at least two of the equal bin variance metric, the lesser bin variance metric, or the greater bin variance metric; determining a final similarity estimator that indicates a measure of similarity between the first set of data samples and the second set of data samples by combining at least two of the equal bin similarity estimator, the lesser bin similarity estimator, or the greater bin similarity estimator using the weighted values; and generating the overlap estimation based on the final similarity estimator.

Indeed, in some embodiments, the overlap estimation generation system 106 generates the overlap estimation between the first set of data samples and the second set of data samples from the equal bin similarity estimator, the lesser bin similarity estimator, or the greater bin similarity estimator based on comparing the equal bin variance metric, the lesser bin variance metric, and the greater bin variance metric. In some implementations, generating the overlap estimation between the first set of data samples and the second set of data samples from the equal bin similarity estimator, the lesser bin similarity estimator, or the greater bin similarity estimator based on comparing the equal bin variance metric, the lesser bin variance metric, and the greater bin variance metric includes: determining a Jaccard similarity between the first set of data samples and the second set of data samples using at least one of the equal bin similarity estimator, the lesser bin similarity estimator, or the greater bin similarity estimator and based on comparing the equal bin variance metric, the lesser bin variance metric, and the greater bin variance metric; and determining the overlap estimation between the first set of data samples and the second set of data samples based on the Jaccard similarity. In some instances, determining the Jaccard similarity between the first set of data samples and the second set of data samples using at least one of the equal bin similarity estimator, the lesser bin similarity estimator, or the greater bin similarity estimator and based on comparing the equal bin variance metric, the lesser bin variance metric, and the greater bin variance metric comprises: comparing the equal bin variance metric, the lesser bin variance metric, and the greater bin variance metric to determine a pair of lowest-valued variance metrics; and determining the Jaccard similarity between the first set of data samples and the second set of data samples utilizing a pair of similarity estimators associated with the pair of lowest-valued variance metrics, the pair of similarity estimators comprising two of the equal bin similarity estimator, the lesser bin similarity estimator, or the greater bin similarity estimator.

In some instances, generating the overlap estimation between the first set of data samples and the second set of data samples from the equal bin similarity estimator, the lesser bin similarity estimator, or the greater bin similarity estimator based on comparing the equal bin variance metric, the lesser bin variance metric, and the greater bin variance metric includes: selecting at least two variance metrics from the equal bin variance metric, the lesser bin variance metric, or the greater bin variance metric by comparing the equal bin variance metric, the lesser bin variance metric, and the greater bin variance; generating at least two weighted values inversely proportional to the at least two variance metrics; and generating the overlap estimation between the first set of data samples and the second set of data samples from at least two of the equal bin similarity estimator, the lesser bin similarity estimator, or the greater bin similarity estimator utilizing the at least two weighted values.

In some instances, the overlap estimation generation system 106 determines a measure of a union between the first set of data samples and the second set of data samples; and generates the overlap estimation between the first set of data samples and the second set of data samples based on the measure of the union and at least one of the equal bin similarity estimator, the lesser bin similarity estimator, or the greater bin similarity estimator.

As mentioned above, in some implementations, the first set of data samples corresponds to a first distribution segment trait and the second set of data samples corresponds to a second distribution segment trait. Accordingly, the overlap estimation generation system 106 generates the overlap estimation between the first set of data samples and the second set of data samples to indicate an amount of overlap between the first distribution segment trait and the second distribution segment trait.

Additionally, the series of acts 900 includes an act 908 of providing the overlap estimation for display via a client device. For example, in one or more embodiments, the act 908 involves providing the overlap estimation for display via a client device in relation to a visual representation of the first set of data samples and a visual representation of the second set of data samples. In some implementations, the overlap estimation generation system 106 more generally provides, for display on a client device, a visual element representing the overlap estimation.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
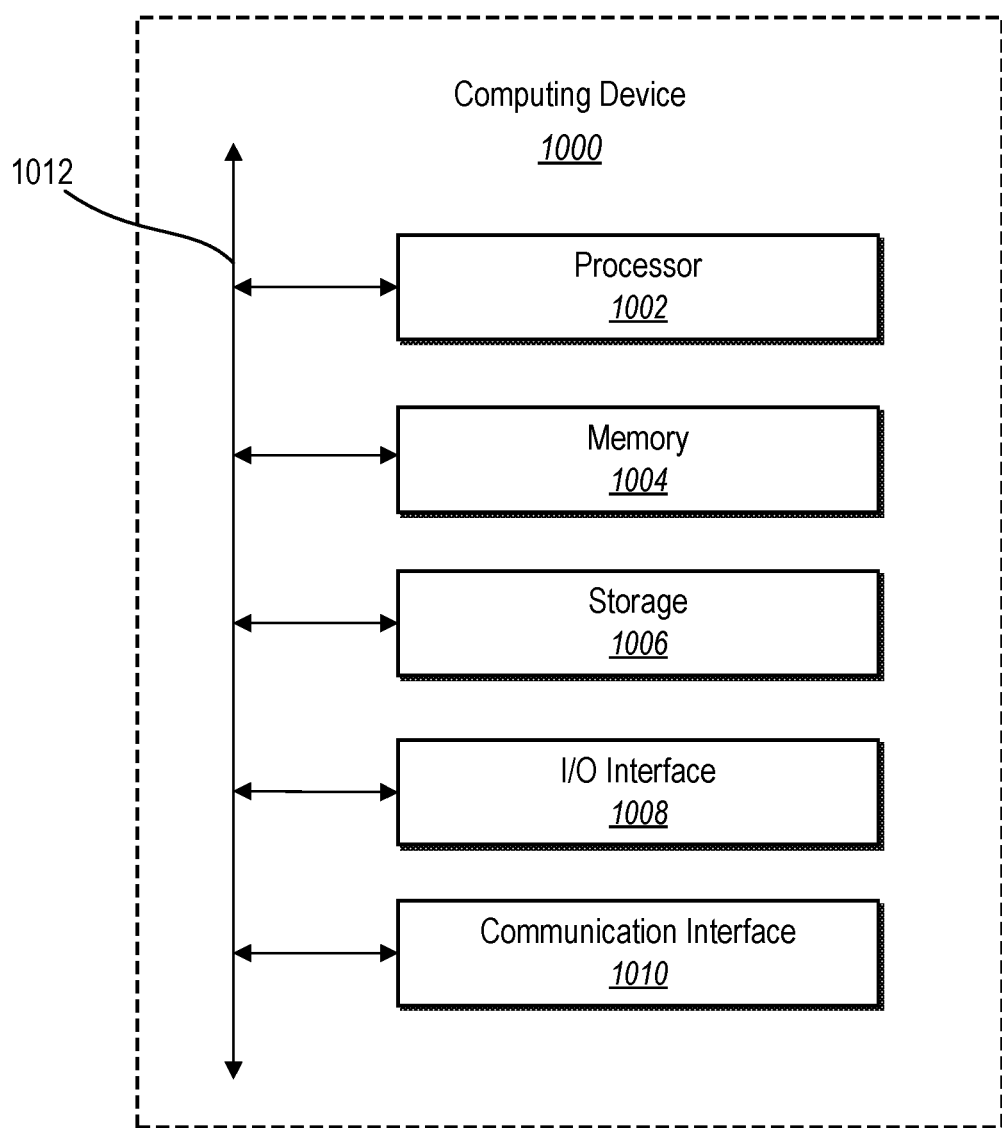
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 102 and/or the client devices 110a-110n). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause the at least one processor to:
  determine an estimated amount of overlap between a first set of data samples and a second set of data samples by:
    generating, utilizing a sketching algorithm, a first sketch vector comprising a first set of bins for the first set of data samples and a second sketch vector comprising a second set of bins for the second set of data samples;
    determining an equal bin similarity estimator, a lesser bin similarity estimator, and a greater bin similarity estimator that each provide a value indicating similarity between the first set of data samples and the second set of data samples based on comparisons between the first set of bins of the first sketch vector and the second set of bins of the second sketch vector; and
    generating an overlap estimation between the first set of data samples and the second set of data samples utilizing variance metrics corresponding to the equal bin similarity estimator, the lesser bin similarity estimator, and the greater bin similarity estimator; and
  provide the overlap estimation for display via a client device in relation to a visual representation of the first set of data samples and a visual representation of the second set of data samples.

2. The non-transitory computer-readable medium of claim 1, further comprising instructions that, when executed by the at least one processor, cause the at least one processor to determine the variance metrics corresponding to the equal bin similarity estimator, the lesser bin similarity estimator, and the greater bin similarity estimator by determining an equal bin variance metric indicating a measure of variance corresponding to the equal bin similarity estimator, a lesser bin variance metric indicating a measure of variance corresponding to the lesser bin similarity estimator, and a greater bin variance metric indicating a measure of variance corresponding to the greater bin similarity estimator.

3. The non-transitory computer-readable medium of claim 2, further comprising instructions that, when executed by the at least one processor, cause the at least one processor to generate the overlap estimation between the first set of data samples and the second set of data samples utilizing the variance metrics corresponding to the equal bin similarity estimator, the lesser bin similarity estimator, and the greater bin similarity estimator by:
  selecting at least one of the equal bin similarity estimator, the lesser bin similarity estimator, and the greater bin similarity estimator by comparing the equal bin variance metric, the lesser bin variance metric, and the greater bin variance metric; and
  determining the overlap estimation from the at least one of the equal bin similarity estimator, the lesser bin similarity estimator, and the greater bin similarity estimator.

4. The non-transitory computer-readable medium of claim 2, further comprising instructions that, when executed by the at least one processor, cause the at least one processor to generate the overlap estimation between the first set of data samples and the second set of data samples utilizing the variance metrics corresponding to the equal bin similarity estimator, the lesser bin similarity estimator, and the greater bin similarity estimator by:
  generating weighted values based on at least two of the equal bin variance metric, the lesser bin variance metric, or the greater bin variance metric;
  determining a final similarity estimator that indicates a measure of similarity between the first set of data samples and the second set of data samples by combining at least two of the equal bin similarity estimator, the lesser bin similarity estimator, or the greater bin similarity estimator using the weighted values; and
  generating the overlap estimation based on the final similarity estimator.

5. The non-transitory computer-readable medium of claim 1, further comprising instructions that, when executed by the at least one processor, cause the at least one processor to:
  determine the equal bin similarity estimator based on the comparisons between the first set of bins of the first sketch vector and the second set of bins of the second sketch vector by determining a first subset of bins from the first set of bins having equal bin values to a corresponding first subset of bins from the second set of bins; and
  determine the lesser bin similarity estimator based on the comparisons between the first set of bins of the first sketch vector and the second set of bins of the second sketch vector by determining a second subset of bins from the first set of bins having lesser bin values than a corresponding second subset of bins from the second set of bins.

6. The non-transitory computer-readable medium of claim 1, further comprising instructions that, when executed by the at least one processor, cause the at least one processor to determine the greater bin similarity estimator based on the comparisons between the first set of bins of the first sketch vector and the second set of bins of the second sketch vector by determining a third subset of bins from the first set of bins having greater bin values than a corresponding third subset of bins from the second set of bins.

7. The non-transitory computer-readable medium of claim 1, further comprising instructions that, when executed by the at least one processor, cause the at least one processor to:
  determine a size of the first set of data samples and a size of the second set of data samples; and
  determine the lesser bin similarity estimator and the greater bin similarity estimator based on the comparisons between the first set of bins of the first sketch vector and the second set of bins of the second sketch vector, the size of the first set of data samples, and the size of the second set of data samples.

8. The non-transitory computer-readable medium of claim 1, further comprising instructions that, when executed by the at least one processor, cause the at least one processor to generate, utilizing the sketching algorithm, the first sketch vector comprising the first set of bins for the first set of data samples and the second sketch vector comprising the second set of bins for the second set of data samples by generating, utilizing a one permutation hashing algorithm, a first one permutation hashing vector comprising the first set of bins for the first set of data samples and a second one permutation hashing vector comprising the second set of bins for the second set of data samples.

9. The non-transitory computer-readable medium of claim 1, further comprising instructions that, when executed by the at least one processor, cause the at least one processor to:

generate, utilizing the sketching algorithm, the first sketch vector comprising the first set of bins for the first set of data samples and the second sketch vector comprising the second set of bins for the second set of data samples by generating the first sketch vector for the first set of data samples corresponding to a first distribution segment trait and the second sketch vector for the second set of data samples corresponding to a second distribution segment trait; and generate the overlap estimation between the first set of data samples and the second set of data samples to indicate an amount of overlap between the first distribution segment trait and the second distribution segment trait.

10. A system comprising:

one or more memory devices comprising a first set of data samples, a second set of data samples, and a sketching algorithm; and one or more server devices configured to cause the system to:

generate, utilizing the sketching algorithm, a first sketch vector comprising a first set of bins for the first set of data samples and a second sketch vector comprising a second set of bins for the second set of data samples;

determine an equal bin similarity estimator, a lesser bin similarity estimator, and a greater bin similarity estimator that each provide a value indicating similarity between the first set of data samples and the second set of data samples by comparing the first set of bins of the first sketch vector and the second set of bins of the second sketch vector to determine whether a bin value of a given bin from the first set of bins is equal to, less than, or greater than a bin value of a corresponding bin from the second set of bins;

determine an equal bin variance metric indicating a measure of variance corresponding to the equal bin similarity estimator, a lesser bin variance metric indicating a measure of variance corresponding to the lesser bin similarity estimator, and a greater bin variance metric indicating a measure of variance corresponding to the greater bin similarity estimator; and generate an overlap estimation between the first set of data samples and the second set of data samples from the equal bin similarity estimator, the lesser bin similarity estimator, or the greater bin similarity estimator based on comparing the equal bin variance metric, the lesser bin variance metric, and the greater bin variance metric.

11. The system of claim 10, wherein the one or more server devices are further configured to cause the system to:

determine the equal bin similarity estimator by determining a first subset of bins from the first set of bins having equal bin values to a corresponding first subset of bins from the second set of bins;

determine the lesser bin similarity estimator by determining a second subset of bins from the first set of bins having lesser bin values than a corresponding second subset of bins from the second set of bins; and determine the greater bin similarity estimator by determining a third subset of bins from the first set of bins having greater bin values than a corresponding third subset of bins from the second set of bins.

12. The system of claim 10, wherein the one or more server devices are configured to cause the system to generate the overlap estimation between the first set of data samples and the second set of data samples from the equal bin similarity estimator, the lesser bin similarity estimator, or the greater bin similarity estimator based on comparing the equal bin variance metric, the lesser bin variance metric, and the greater bin variance metric by:

determining a Jaccard similarity between the first set of data samples and the second set of data samples using at least one of the equal bin similarity estimator, the lesser bin similarity estimator, or the greater bin similarity estimator and based on comparing the equal bin variance metric, the lesser bin variance metric, and the greater bin variance metric; and determining the overlap estimation between the first set of data samples and the second set of data samples based on the Jaccard similarity.

13. The system of claim 12, wherein determining the Jaccard similarity between the first set of data samples and the second set of data samples using at least one of the equal bin similarity estimator, the lesser bin similarity estimator, or the greater bin similarity estimator and based on comparing the equal bin variance metric, the lesser bin variance metric, and the greater bin variance metric comprises:

comparing the equal bin variance metric, the lesser bin variance metric, and the greater comparing the equal bin variance metric, the lesser bin variance metric, and the greater bin variance metric to determine a pair of lowest-valued variance metrics; and determining the Jaccard similarity between the first set of data samples and the second set of data samples utilizing a pair of similarity estimators associated with the pair of lowest-valued variance metrics, the pair of similarity estimators comprising two of the equal bin similarity estimator, the lesser bin similarity estimator, or the greater bin similarity estimator.

14. The system of claim 10, wherein the one or more server devices are configured to generate the overlap estimation between the first set of data samples and the second set of data samples from the equal bin similarity estimator, the lesser bin similarity estimator, or the greater bin similarity estimator based on comparing the equal bin variance metric, the lesser bin variance metric, and the greater bin variance metric by:

selecting at least two variance metrics from the equal bin variance metric, the lesser bin variance metric, or the greater bin variance metric by comparing the equal bin variance metric, the lesser bin variance metric, and the greater bin variance metric;

generating at least two weighted values inversely proportional to the at least two variance metrics; and generating the overlap estimation between the first set of data samples and the second set of data samples from at least two of the equal bin similarity estimator, the lesser bin similarity estimator, or the greater bin similarity estimator utilizing the at least two weighted values.

15. The system of claim 10, wherein the one or more server devices are further configured to generate, utilizing the sketching algorithm, the first sketch vector comprising the first set of bins for the first set of data samples and the second sketch vector comprising the second set of bins for the second set of data samples by:

generating a first one permutation hashing vector utilizing a one permutation hashing algorithm to populate the first set of bins with bin values corresponding to a first distribution segment trait; and generating a second one permutation hashing vector utilizing the one permutation hashing algorithm to populate the second set of bins with bin values corresponding to a second distribution segment trait.

16. The system of claim 10, wherein the one or more server devices are further configured to cause the system to:
determine a measure of a union between the first set of data samples and the second set of data samples; and
generate the overlap estimation between the first set of data samples and the second set of data samples based on the measure of the union and at least one of the equal bin similarity estimator, the lesser bin similarity estimator, or the greater bin similarity estimator.

17. A computer-implemented method for efficiently determining amounts of overlap between digital data repositories comprising:
generating, utilizing a hashing algorithm, a first sketch vector comprising a first hashing vector for a first set of data samples and a second sketch vector comprising a second hashing vector for a second set of data samples;
determining an equal bin similarity estimator, a lesser bin similarity estimator, and a greater bin similarity estimator based on a comparison between the first sketch vector and the second sketch vector; and
generating an overlap estimation between the first set of data samples and the second set of data samples utilizing variance metrics corresponding to the equal bin similarity estimator, the lesser bin similarity estimator, and the greater bin similarity estimator.

18. The computer-implemented method of claim 17, wherein generating, utilizing the hashing algorithm, the first sketch vector comprising the first hashing vector for the first set of data samples and the second sketch vector comprising the second hashing vector for the second set of data samples comprises generating, utilizing a one permutation hashing algorithm, a first one permutation hashing vector comprising hash values corresponding to the first set of data samples and a second one permutation hashing vector comprising hash values corresponding to the second set of data samples.

19. The computer-implemented method of claim 17, wherein determining the equal bin similarity estimator, the lesser bin similarity estimator, and the greater bin similarity estimator based on the comparison between the first sketch vector and the second sketch vector comprises determining the equal bin similarity estimator, the lesser bin similarity estimator, and the greater bin similarity estimator based on bin values of the first sketch vector that are equal to, lesser than, or greater than corresponding bin values of the second sketch vector.

20. The computer-implemented method of claim 17, further comprising providing, for display on a client device, a visual element representing the overlap estimation.

* * * * *